(12) United States Patent
Schulz et al.

(10) Patent No.: US 11,533,013 B1
(45) Date of Patent: Dec. 20, 2022

(54) PULSE WIDTH MODULATION CLOCK SYNCHRONIZATION

(71) Applicant: Rivian IP Holdings, LLC, Plymouth, MI (US)

(72) Inventors: Steven E. Schulz, Torrance, CA (US); David Tang, Rancho Cucamonga, CA (US); Daniel L. Kowalewski, Redondo Beach, CA (US); Silva Hiti, Redondo Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/388,984

(22) Filed: Jul. 29, 2021

(51) Int. Cl.
*H02P 27/08* (2006.01)
*H02M 7/5395* (2006.01)
(Continued)

(52) U.S. Cl.
CPC ........ *H02P 27/085* (2013.01); *H02M 1/0043* (2021.05); *H02M 7/5395* (2013.01); *H02K 7/006* (2013.01)

(58) Field of Classification Search
CPC . H02P 27/085; H02M 1/0043; H02M 7/5395; H02K 7/006
See application file for complete search history.

(56) References Cited

U.S. PATENT DOCUMENTS 8,223,511 B2 * 7/2012 Cheng ..................... H02M 1/44
363/40

8,619,446 B2 * 12/2013 Liu .......................... H02M 7/49
363/71
(Continued)

OTHER PUBLICATIONS

Brubaker M.A. et al., "High Performance DC Link Capacitor/Bus Sourcing Dual Infineon HybridPACKTM Drive Inverters for EV Applications", PCIM Europe 2017; International Exhibition and Conference for Power Electronics, Intelligent Motion, Renewable Energy and Energy Management, 2017, pp. 1-8.

*Primary Examiner* — Yusef A Ahmed
(74) *Attorney, Agent, or Firm* — Clements Bernard Baratta; Christopher L. Bernard

(57) ABSTRACT

Various disclosed embodiments include illustrative controllers, dual power inverter modules, and electric vehicles. In an illustrative embodiment, a controller includes a first processor for a first power inverter. Computer-readable media is configured to store computer-executable instructions configured to cause the first processor to: generate a first clock signal and a second clock signal; identify a pulse width modulation method of the first power inverter and a pulse width modulation method of a second power inverter; identify and compare a switching frequency of the first power inverter and a switching frequency of the second power inverter; determine an optimized phase shift between the first power inverter and the second power inverter responsive to the pulse width modulation method of the first power inverter and the pulse width modulation method of the second power inverter and the switching frequency of the first power inverter and the switching frequency of the second power inverter; and synchronize the optimized phase shift between the first power inverter and the second power inverter. A second processor for the second power inverter is configured to receive the second clock signal.

15 Claims, 24 Drawing Sheets

(51) Int. Cl.
*H02M 1/00* (2006.01)
*H02K 7/00* (2006.01)

(56) References Cited

U.S. PATENT DOCUMENTS

| | | | |
|---|---|---|---|
| 9,887,616 B2* | 2/2018 | Bai | H02M 7/219 |
| 10,020,766 B2* | 7/2018 | Royak | H02P 23/14 |
| 10,158,299 B1* | 12/2018 | Wei | H02M 1/12 |
| 10,541,626 B1* | 1/2020 | Lamb | H02M 7/53873 |
| 10,601,343 B1* | 3/2020 | Lamb | H02P 27/085 |
| 10,784,797 B1* | 9/2020 | Sedano | H02M 1/08 |
| 11,342,878 B1* | 5/2022 | Abuelnaga | H02M 5/4585 |
| 2002/0024828 A1* | 2/2002 | Hayashi | H02M 5/4505 363/35 |
| 2004/0160201 A1* | 8/2004 | Rahman | H02P 23/06 318/41 |
| 2006/0034364 A1* | 2/2006 | Breitzmann | H02M 7/53871 375/238 |
| 2007/0121353 A1* | 5/2007 | Zhang | H02J 3/381 363/39 |
| 2009/0033274 A1* | 2/2009 | Perisic | B60L 50/51 318/440 |
| 2009/0134828 A1* | 5/2009 | Chakrabarti | H02P 27/08 318/440 |
| 2009/0134835 A1* | 5/2009 | Welchko | H02P 6/10 318/400.04 |
| 2009/0251000 A1* | 10/2009 | Su | B60L 58/33 307/9.1 |
| 2010/0172162 A1* | 7/2010 | Tallam | H02M 7/5387 363/37 |
| 2012/0081932 A1* | 4/2012 | Videt | H02M 5/4585 363/35 |
| 2014/0015326 A1* | 1/2014 | Eberhardt | H02M 7/53873 307/82 |
| 2016/0059711 A1* | 3/2016 | Holmes | B60K 1/00 903/906 |
| 2017/0294852 A1* | 10/2017 | Correa Vasques | H02M 7/493 |
| 2018/0219501 A1* | 8/2018 | Wagoner | H02M 1/08 |
| 2018/0251036 A1* | 9/2018 | Tapadia | H02P 5/74 |
| 2019/0084444 A1* | 3/2019 | Ge | B60L 50/15 |
| 2020/0021226 A1* | 1/2020 | Welchko | H02P 27/085 |
| 2021/0091681 A1* | 3/2021 | Abuelnaga | H02P 21/22 |
| 2022/0045618 A1* | 2/2022 | Kumar | H02M 7/5387 |
| 2022/0077762 A1* | 3/2022 | Fukuta | H02M 1/12 |
| 2022/0094259 A1* | 3/2022 | Cui | H02M 1/327 |

\* cited by examiner

PULSE WIDTH MODULATION CLOCK SYNCHRONIZATION

INTRODUCTION

The present disclosure relates to inverters for drive units of electric vehicles. A conventional electric vehicle with two electric motors per drive unit has two inverters (one inverter per motor) and each inverter is controlled by its own inverter controller. Use of a separate inverter controller for each inverter adds weight and increases energy consumption, thereby resulting in reduced vehicle range.

BRIEF SUMMARY

Various disclosed embodiments include illustrative controllers, dual power inverter modules, and electric vehicles.

In an illustrative embodiment, a controller includes a first processor for a first power inverter. Computer-readable media is configured to store computer-executable instructions configured to cause the first processor to: generate a first clock signal and a second clock signal; identify a pulse width modulation method of the first power inverter and a pulse width modulation method of a second power inverter; identify and compare a switching frequency of the first power inverter and a switching frequency of the second power inverter; determine an optimized phase shift between the first power inverter and the second power inverter responsive to the pulse width modulation method of the first power inverter and the pulse width modulation method of the second power inverter and the switching frequency of the first power inverter and the switching frequency of the second power inverter; and synchronize the optimized phase shift between the first power inverter and the second power inverter. A second processor for the second power inverter is configured to receive the second clock signal.

In another illustrative embodiment, a dual power inverter module includes a DC link capacitor electrically connectable to a source of high voltage direct current (DC) electrical power. A first power inverter is electrically connectable to the DC link capacitor and is configured to convert high voltage DC electrical power to three phase high voltage alternating current (AC) electrical power. The first power inverter is further configured to supply the three phase high voltage AC electrical power to a first electric motor. A second power inverter is electrically connectable to the DC link capacitor and is configured to convert high voltage DC electrical power to three phase high voltage AC electrical power. The second power inverter is further configured to supply the three phase high voltage AC electrical power to a second electric motor. A controller includes: a first processor for the first power inverter; computer-readable media configured to store computer-executable instructions configured to cause the first processor to: generate a first clock signal and a second clock signal; identify a pulse width modulation method of the first power inverter and a pulse width modulation method of the second power inverter; identify and compare a switching frequency of the first power inverter and a switching frequency of the second power inverter; determine an optimized phase shift between the first power inverter and the second power inverter responsive to the pulse width modulation method of the first power inverter and the pulse width modulation method of the second power inverter and the switching frequency of the first power inverter and the switching frequency of the second power inverter; and synchronize the optimized phase shift between the first power inverter and the second power inverter. A second processor for the second power inverter is configured to receive the second clock signal.

In another illustrative embodiment, an electric vehicle includes a vehicle body, a high voltage direct current (DC) electrical battery disposed within the vehicle body, first and second (e.g., left and right) electric motors mechanically couplable to rotate at least one set of axles (e.g., wheels), and at least one dual power inverter module. The at least one dual power inverter module includes: a DC link capacitor electrically connectable to the high voltage DC electrical battery; a first power inverter electrically connectable to the DC link capacitor and configured to convert high voltage DC electrical power to three phase high voltage alternating current (AC) electrical power, the first power inverter being further configured to supply the three phase high voltage AC electrical power to an electric motor chosen from the first and second (e.g., left and right) electric motors; a second power inverter electrically connectable to the DC link capacitor and configured to convert high voltage DC electrical power to three phase high voltage AC electrical power, the second power inverter being further configured to supply the three phase high voltage AC electrical power to the other electric motor chosen from the first and second (e.g., left and right) electric motors; and a common controller electrically connectable to the first power inverter and the second power inverter, the common controller being configured to control the first power inverter and the second power inverter. The common controller includes: a first processor for the first power inverter; computer-readable media configured to store computer-executable instructions configured to cause the first processor to: generate a first clock signal and a second clock signal; identify a pulse width modulation method of the first power inverter and a pulse width modulation method of the second power inverter; identify and compare a switching frequency of the first power inverter and a switching frequency of the second power inverter; determine an optimized phase shift between the first power inverter and the second power inverter responsive to the pulse width modulation method of the first power inverter and the pulse width modulation method of the second power inverter and the switching frequency of the first power inverter and the switching frequency of the second power inverter; and synchronize the optimized phase shift between the first power inverter and the second power inverter. A second processor for the second power inverter is configured to receive the second clock signal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1A:
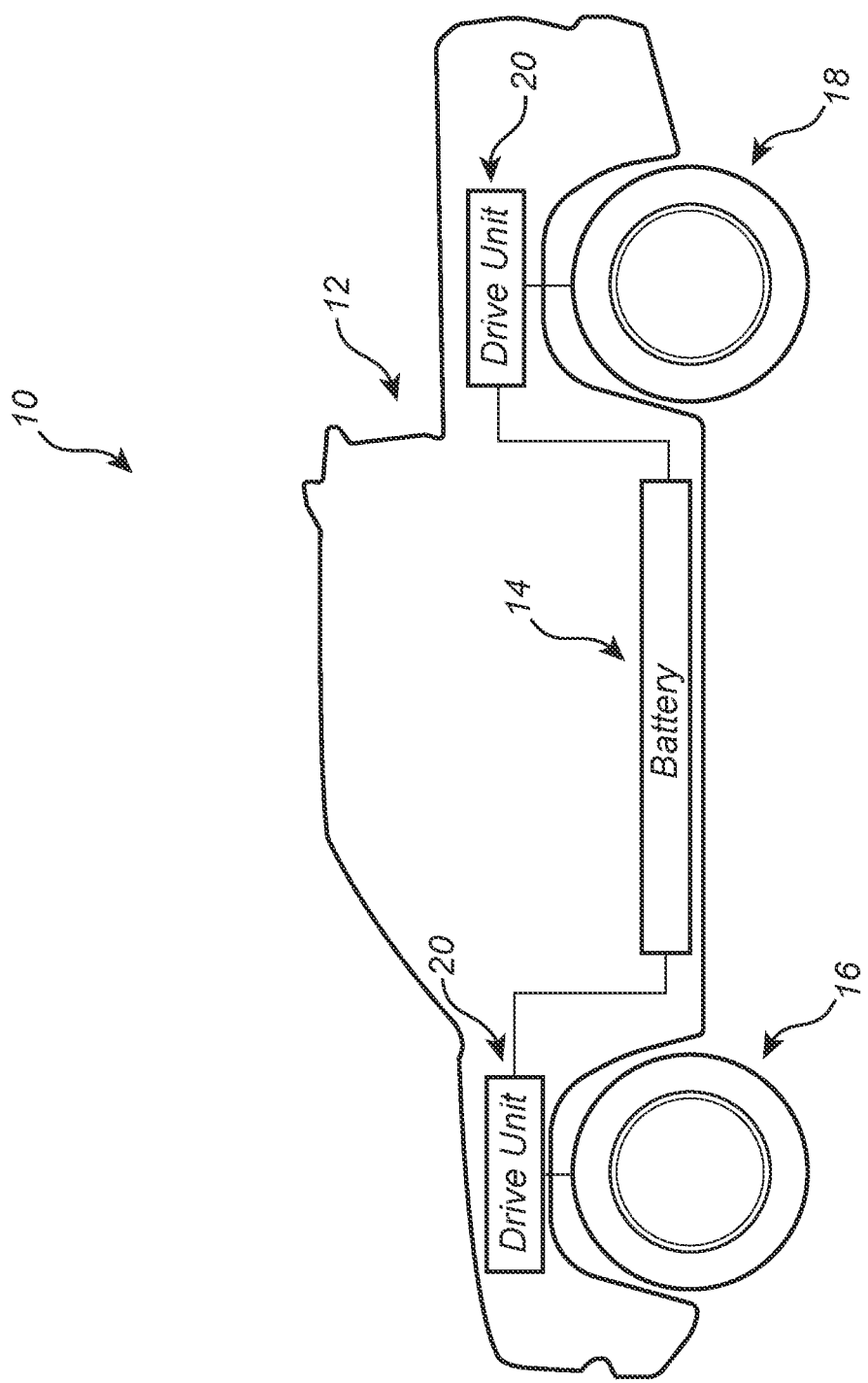
FIG. 1A is a schematic illustration of an illustrative electric vehicle with at least one drive unit.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative dual power inverter modules, electric vehicles, and methods.

Figure 1B:
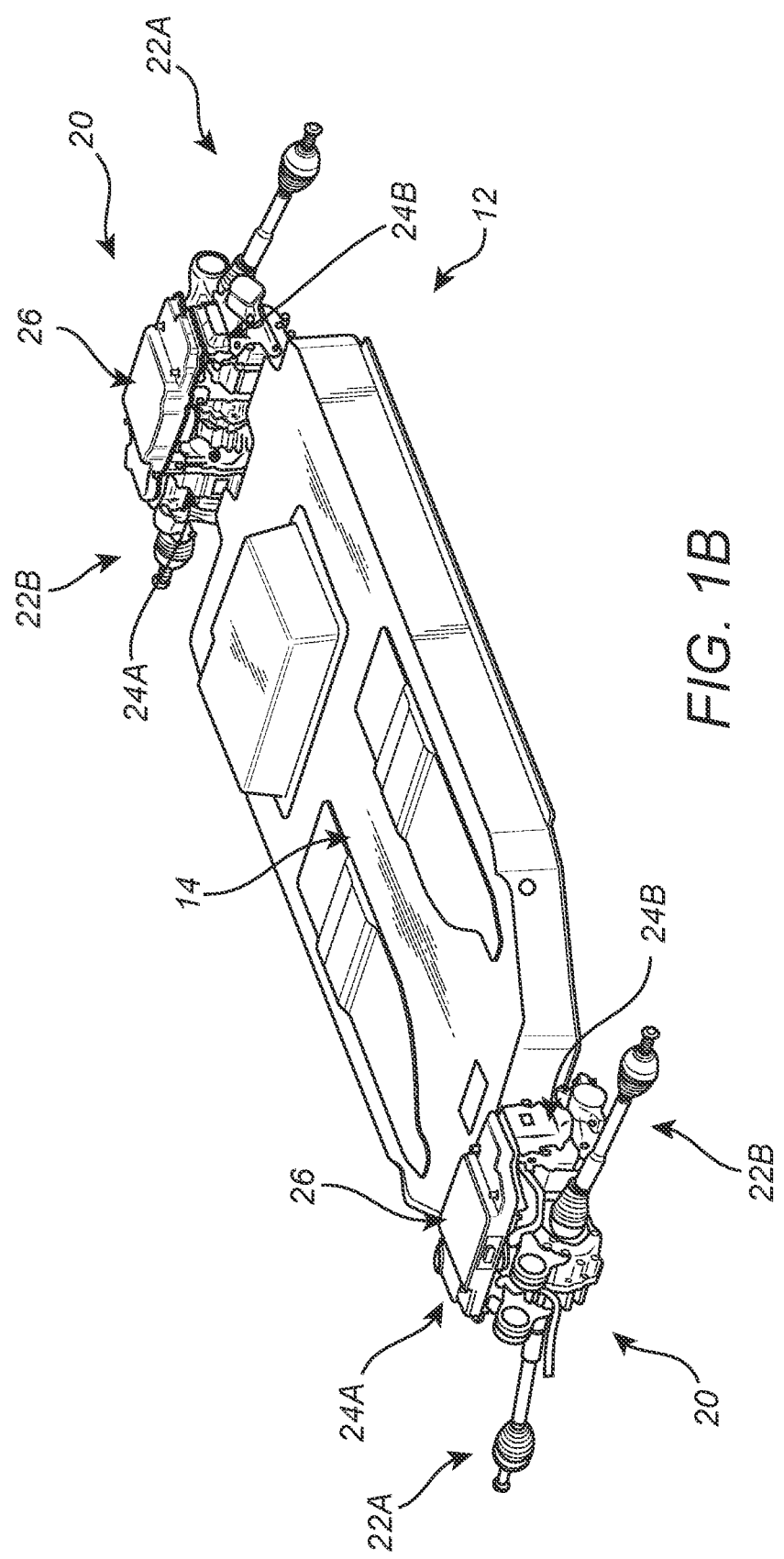
FIG. 1B is a perspective view of lower body structure of the electric vehicle of FIG. 1 with illustrative drive units.

Referring now to FIGS. 1A and 1B and given by way of overview, in various embodiments an electric vehicle 10 includes a vehicle body 12. A high voltage direct current (DC) electrical battery 14 is disposed within the vehicle body 12. Left and right front wheels 16 (only the left front wheel 16 is shown) and left and right rear wheels 18 (only the left rear wheel 18 is shown) are configured to rotate. At least one drive unit 20 is mechanically couplable to rotate the front wheels 16 or the rear wheels 18 (and in some embodiments one drive unit 20 may be mechanically couplable to rotate the front wheels 16 and another drive unit 20 may be mechanically couplable to rotate the rear wheels 18). Each drive unit 20 is electrically connectable to receive high voltage DC electrical power from the battery 14. Each drive unit 20 includes axles 22A and 22B that are mechanically couplable to rotate an associated wheel 16 or 18 and electrical motors 24A and 24B mechanically couplable to rotate its associated axle 22A and 22B, respectively. As will be explained below, each drive unit 20 also includes a dual power inverter module 26 that is electrically connectable to receive the high voltage DC electrical power from the battery 14. The dual power inverter module 26 includes two inverters (not shown) configured to create three-phase, high voltage alternating current (AC) electrical power from the high voltage DC electrical power and provide the three-phase, high voltage AC electrical power to an associated electrical motor. A common controller (not shown) is configured to control both of the inverters in the dual power inverter module 26.

For sake of brevity, illustrative details are set forth below by way of non-limiting examples in the context of a motor vehicle. However, it will be appreciated that the vehicle 10 can be any type of vehicle whatsoever as desired without limitation. Given by way of non-limiting example, in various embodiments the vehicle 10 may be an electric vehicle (that is, an all-electrically driven vehicle) or a hybrid vehicle. For example and given by way of non-limiting examples, in various embodiments the vehicle 10 may include a motor vehicle driven by wheels and/or tracks, such as, without limitation, an automobile, a truck, a sport utility vehicle (SUV), a van, an all-terrain vehicle (ATV), a motorcycle, an electric bicycle, a tractor, a lawn mower such as without limitation a riding lawn mower, a snowmobile, and the like. Given by way of further non-limiting examples, in various embodiments the vehicle 10 may include a marine vessel such as, without limitation, a boat, a ship, a submarine, a submersible, an autonomous underwater vehicle (AUV), and the like. Given by way of further non-limiting examples, in various embodiments the vehicle 10 may include an aircraft such as, without limitation, a fixed wing aircraft, a rotary wing aircraft, and a lighter-than-air (LTA) craft.

Also for sake of brevity, illustrative details regarding the drive unit 20 are set forth in the context of a motor vehicle. Because the vehicle 10 is not limited to the illustrative example of a motor vehicle, it will be appreciated that the drive unit 20 also is not limited to applicability to a motor vehicle. To that end, in various embodiments the motor (or motors) of the drive unit 20 are configured to drive the vehicle 10. That is, in various embodiments the electric motor (or motors) of the drive unit 20 may drive any drive member that drives any propulsion device, such as without limitation a wheel or wheels, a track or tracks, a propellor or propellors, a propulsor or propulsors, a rotor or rotors, or the like, associated with the vehicle 10.

For example, in some embodiments in a motor vehicle one drive unit 20 may include one motor configured to drive one drive member such as an axle or a chain ring that drives one wheel or track, in some other embodiments in a motor vehicle one drive unit 20 may include one motor configured to drive an axle that rotates two wheels or two tracks, and in some other embodiments in a motor vehicle one drive unit 20 may include one motor configured to drive an axle that rotates one wheel or one track and another motor configured to drive another axle that rotates another wheel or another track.

Similarly, in some embodiments in a marine vessel one drive unit 20 may include one motor configured to drive one propeller or propulsor, in some other embodiments in a marine vessel one drive unit 20 may include one motor configured to drive a shaft that rotates two propellers or two propulsors, and in some other embodiments in a marine vessel one drive unit 20 may include one motor configured to drive a shaft that rotates one propeller or propulsor and another motor configured to drive another shaft that rotates another propeller or propulsor.

Likewise, in some embodiments in an aircraft one drive unit 20 may include one motor configured to drive one propeller or rotor, in some other embodiments in an aircraft one drive unit 20 may include one motor configured to drive a shaft that rotates two propellers or two rotors, and in some other embodiments in an aircraft one drive unit 20 may include one motor configured to drive a shaft that rotates one propeller or rotor and another motor configured to drive another shaft that rotates another propeller or rotor.

Now that an overview has been set forth, illustrative details will be explained with examples that are given by way of illustration only and not of limitation.

As mentioned above, the at least one drive unit 20 is mechanically couplable to rotate the front wheels 16 or the rear wheels 18 (and in some embodiments one drive unit 20 may be mechanically couplable to rotate the front wheels 16 and another drive unit 20 may be mechanically couplable to rotate the rear wheels 18). As also mentioned above, each drive unit 20 includes the axles 22A and 22B that are mechanically couplable to rotate an associated wheel 16 or 18 and electrical motors 24A and 24B that are mechanically couplable to rotate its associated axle 22A and 22B, respectively.

Referring additionally to FIGS. 2A-2E, in various embodiments each electrical motor 24A and 24B is mechanically couplable to rotate its associated axle 22A and 22B, respectively, via a set of gears 28A and 28B, respectively. Each set of gears 28A and 28B is configured to provide speed and torque conversions from its associated electrical motor 24A or 24B, respectively, to its associated axle 22A or 22B, respectively, and, ultimately, an associated wheel 16 or 18.

Figure 2A:
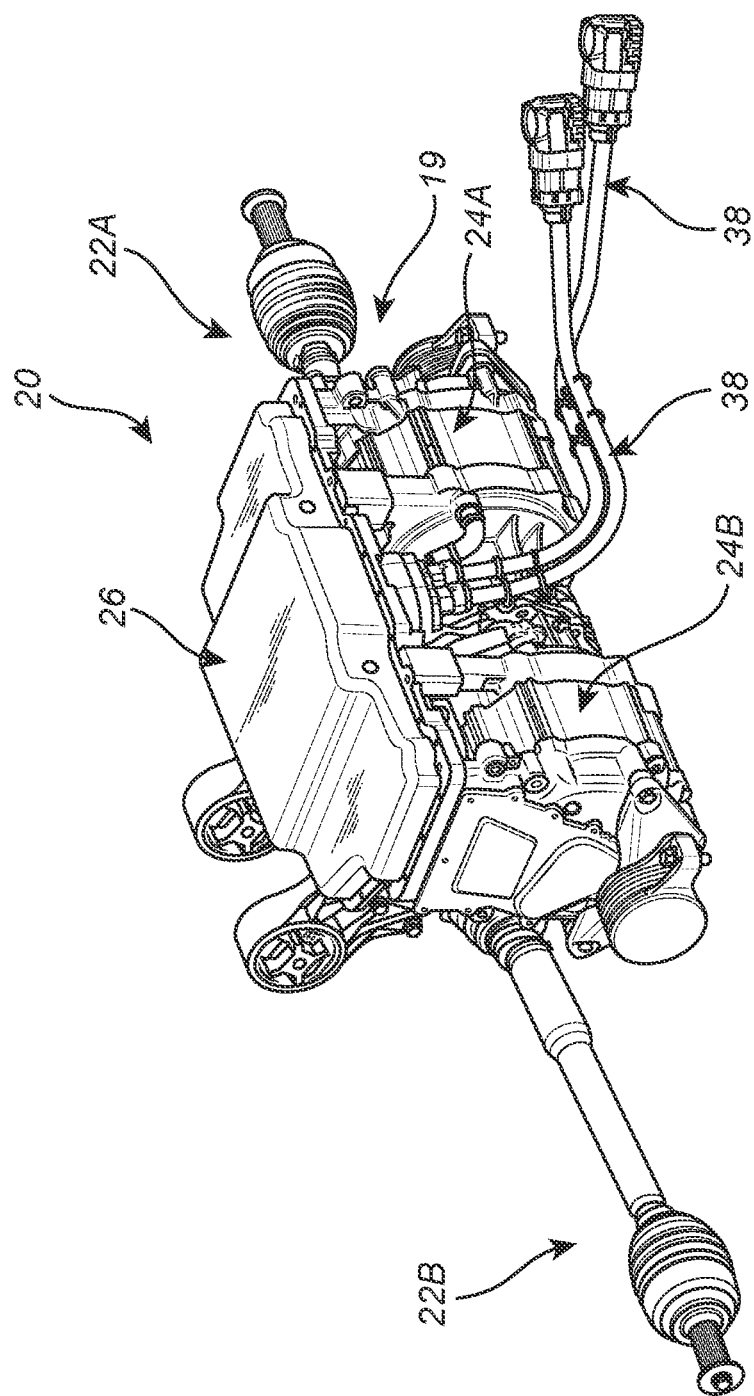
FIG. 2A is a perspective view of an illustrative drive unit of FIG. 1B.
Figure 2B:
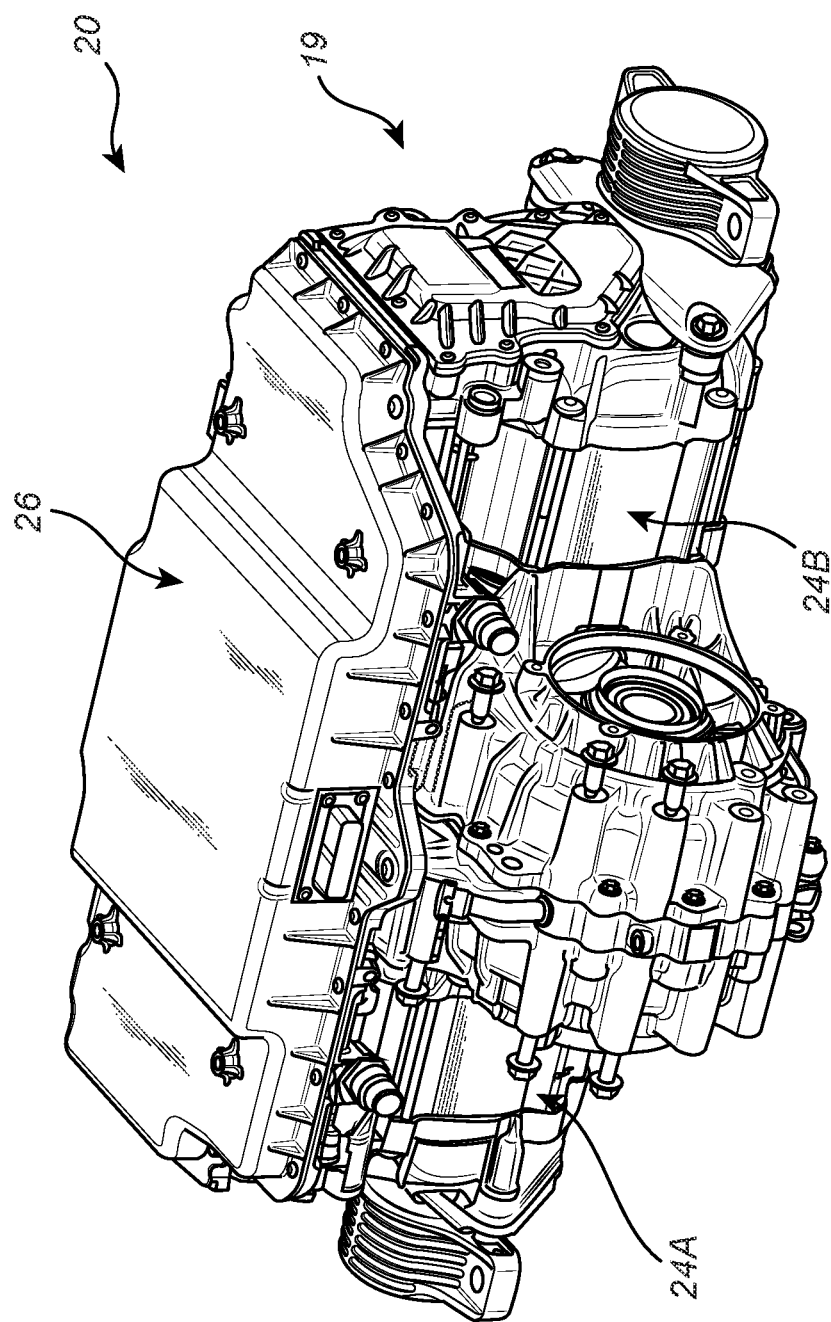
FIG. 2B is another perspective view of the drive unit of FIG. 1B.
Figure 2C:
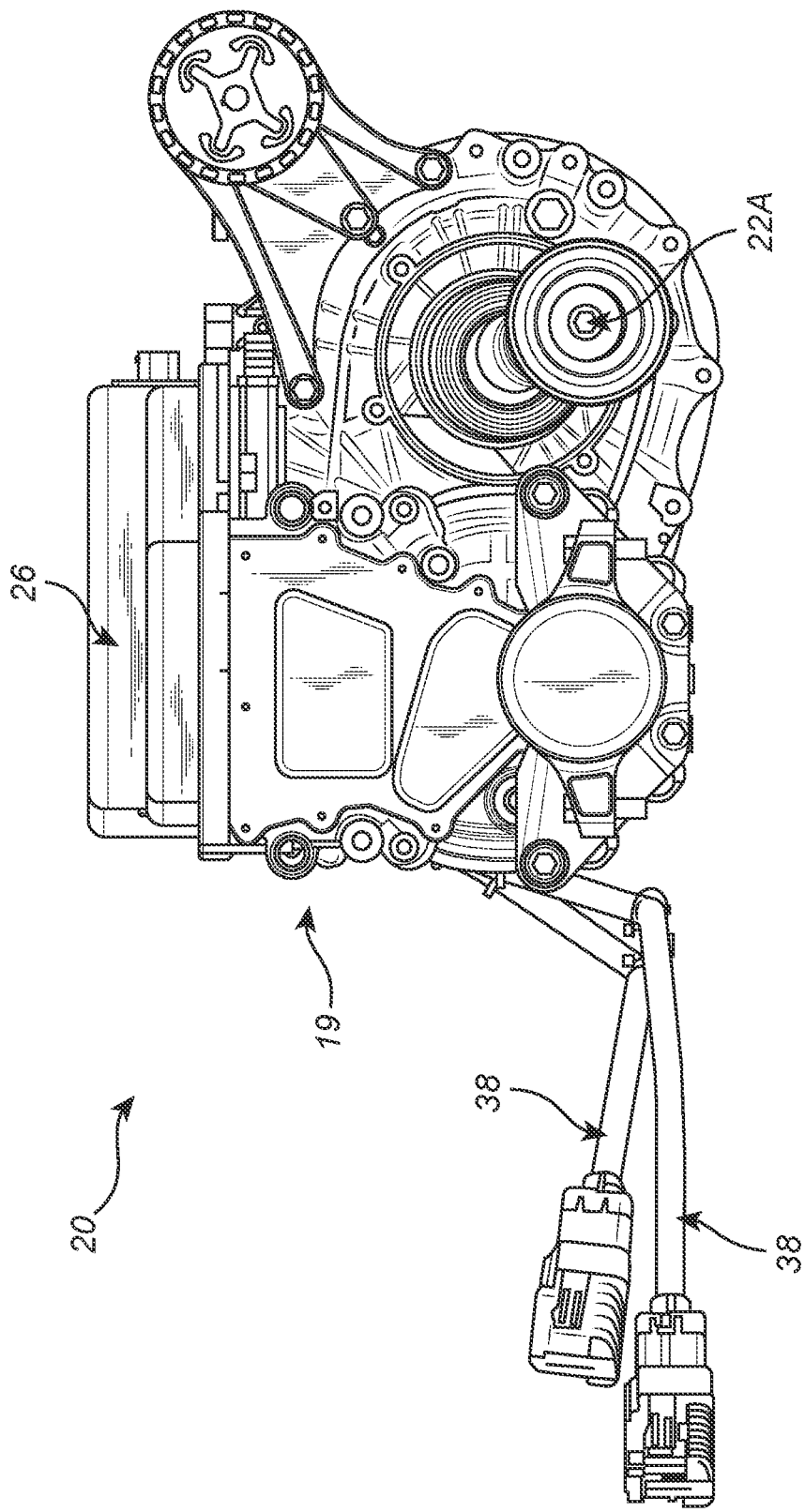
FIG. 2C is a side plan view of the drive unit of FIG. 1B.
Figure 2D:
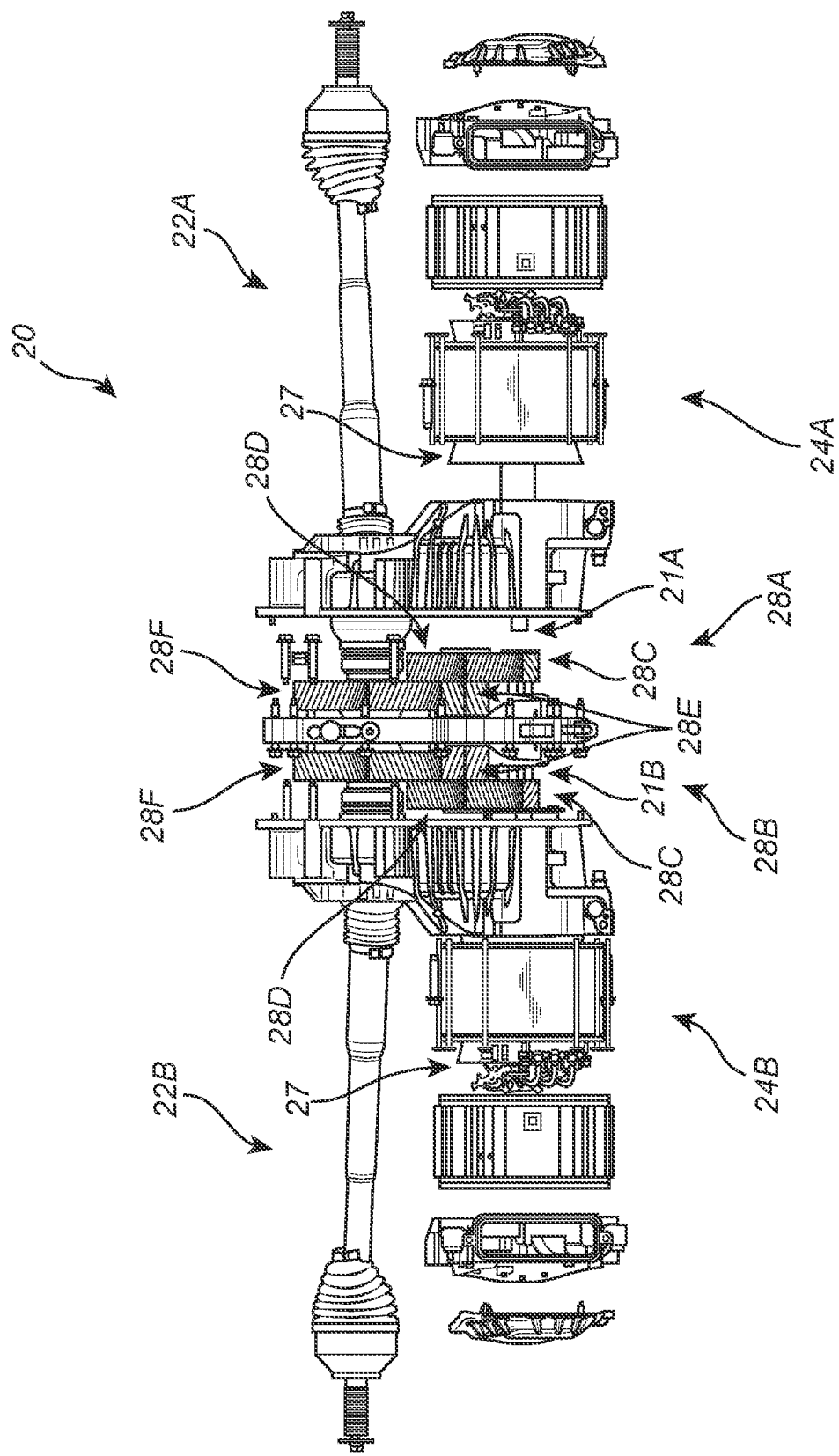
FIG. 2D is an exploded perspective view of the drive unit of FIG. 1B.

As shown in FIG. 2D, a shaft 21A is configured to be rotated by its associated rotor 27 of its electrical motor 24A and a shaft 21B is configured to be rotated by its associated rotor 27 of its electrical motor 24B. The shafts 21A and 21B are supported and constrained within bearings (not shown) disposed on a frame 19. The set of gears 28A is disposed within the frame 19 and is configured to rotatably engage the axle 22A and the set of gears 28B is disposed within the frame 19 and is configured to rotatably engage the axle 22B. The electrical motor 24A is configured to rotatably engage the set of gears 28A and the electrical motor 24B is configured to rotatably engage the set of gears 28B.

In various embodiments, each of the sets of gears 28A and 28B is configured to provide speed and torque conversions from its associated electrical motor 24A or 24B to its associated axle 22A or 22B and, ultimately, an associated wheel 16 or 18. For example and given by way of illustration only and not of limitation, in various embodiments a gear 28C is configured to be rotated by its associated shaft 21A or 21B. A gear 28D is mounted on a shaft (not shown for purposes of clarity) and is configured to be meshedly engaged by the gear 28C. A gear 28E also is mounted on the shaft (not shown for purposes of clarity). A gear 28F is mounted on the axle 22A or 22B and is configured to be meshedly engaged by the gear 28E. It will be appreciated that, in various embodiments, the sets of gears 28A and 28B may include any number of suitable gears (such as, without limitation, planetary gears) with gear ratios selected as desired for a particular application to achieve desired speed and torque conversions. It will be appreciated that gears for use in electric vehicles are well known in the art. Therefore, further description of their construction and operation are not necessary for an understanding of disclosed subject matter.

In some embodiments, the axles 22A and 22B may be fixedly couplable to their associated wheels 16 or 18. For example and without limitation, in some such embodiments the front wheels 16 may be fixedly couplable to their associated axles 22A and 22B. It will be appreciated that such fixed coupling may help contribute to reducing mechanical complexity and may help contribute to enabling the front wheels 16 to remain steerable (such as when the vehicle 10 is being towed with the front wheels 16 and the rear wheels 18 engaged on a surface of a road (that is, flat towing)).

In some other embodiments, the axles 22A and 22B may be removably couplable to their associated wheels 16 or 18. For example and without limitation, in some such embodiments the rear wheels 18 may be removably couplable to their associated axles 22A and 22B. It will be appreciated that such removable coupling of the rear wheels 18 may help contribute to avoiding generation of braking torque and/or uncontrolled electrical generation during towing.

It will be appreciated that each drive unit 20 drives either left and right front wheels 16 or left and right rear wheels 18. Therefore, both of the electrical motors 24A and 24B of a given drive unit 20 may experience a same or similar range of speed and torque demands. To service such ranges of speed and torque demands, in various embodiments both of the electrical motors 24A and 24B of a given drive unit 20 may have the same voltage and current ratings. For example, in various embodiments (such as in high voltage systems), a voltage rating may be in a range from around 300 Vrms to around 600 Vrms line-to-line and a current rating may be in a range from around 300 Arms to around 900 Arms. Given by way of non-limiting example by way of illustration only, an illustrative voltage rating may be 312 Vrms and an illustrative current rating may be 550 Arms (based on a 400 VDC system). However, it will be appreciated that the electrical motors 24A and 24B may have any voltage ratings and any current ratings as desired for a particular application.

In various embodiments, the electrical motors 24A and 24B may be any suitable type of electrical motor as desired. For example, in some embodiments the electrical motors 24A and 24B may include synchronous electrical motors. In some such embodiments, the synchronous electrical motors may include without limitation permanent magnet electrical motors or the like. In some other embodiments the electrical motors 24A and 24B may include without limitation an asynchronous motor (or induction motor)—like a polyphase AC induction motor or the like.

As mentioned above, in various embodiments each drive unit 20 drives either left and right front wheels 16 or left and right rear wheels 18 and, therefore, both of the electrical motors 24A and 24B of a given drive unit 20 may experience a same or similar range of speed and torque demands. Therefore, in various embodiments both inverters of a given drive unit 20 may have the same voltage output ratings and the same current output ratings. Given by way of illustration only and not of limitation, in various embodiments both inverters of a given drive unit 20 may have a voltage output rating of 312 Vrms and a current output rating of 550 Arms (based on 400 VDC input). However, it will be appreciated that the inverters of a given drive unit 20 may have any voltage output ratings and any current output ratings as desired for a particular application.

Figure 2E:
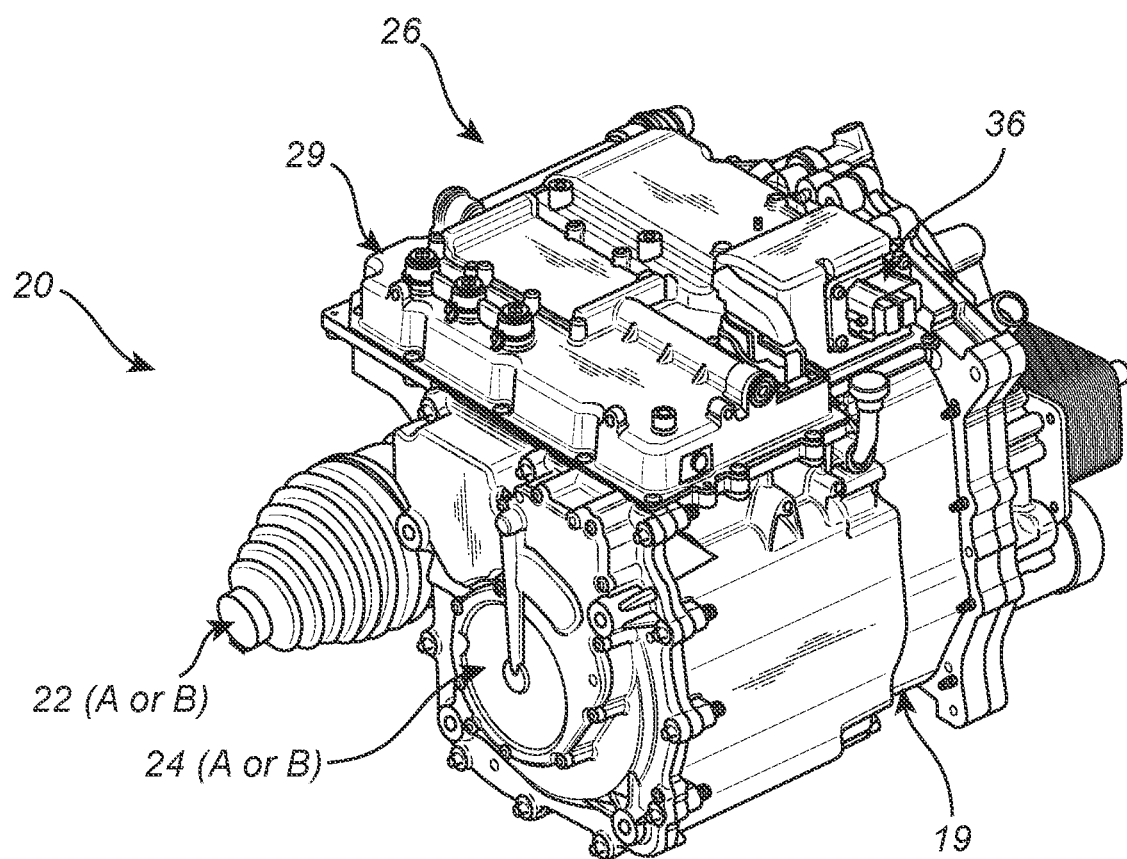
FIG. 2E is a perspective view of another illustrative drive unit.

It will be appreciated that, in various embodiments, the dual power inverter module 26 may be physically associated with the frame 19 in any suitable manner as desired for a particular application. For example and without limitation, in some embodiments and as shown in FIGS. 2A-2C the dual power inverter module 26 may be a module within a sealed container and physically disposed on the frame 19 external to the frame. As another example and as shown in FIG. 2E without limitation, in some other embodiments the dual power inverter module 26 may be integratably mountable with the frame 19. In some such embodiments a housing 29 has an open face (not shown) defined therein. Inverter circuitry (discussed below) is disposed in the housing 29. In such embodiments, the open face of the housing 29 is mated to an opening (not shown) in the frame 19. Such other embodiments are discussed in commonly-owned U.S. patent application Ser. No. 17/244,288 filed Apr. 29, 2021 entitled "INVERTER MODULE INTEGRATABLY MOUNTABLE WITH DRIVE UNIT OF VEHICLE" assigned to and filed by Applicant, the entire contents of which are hereby incorporated by reference.

Figure 3A:
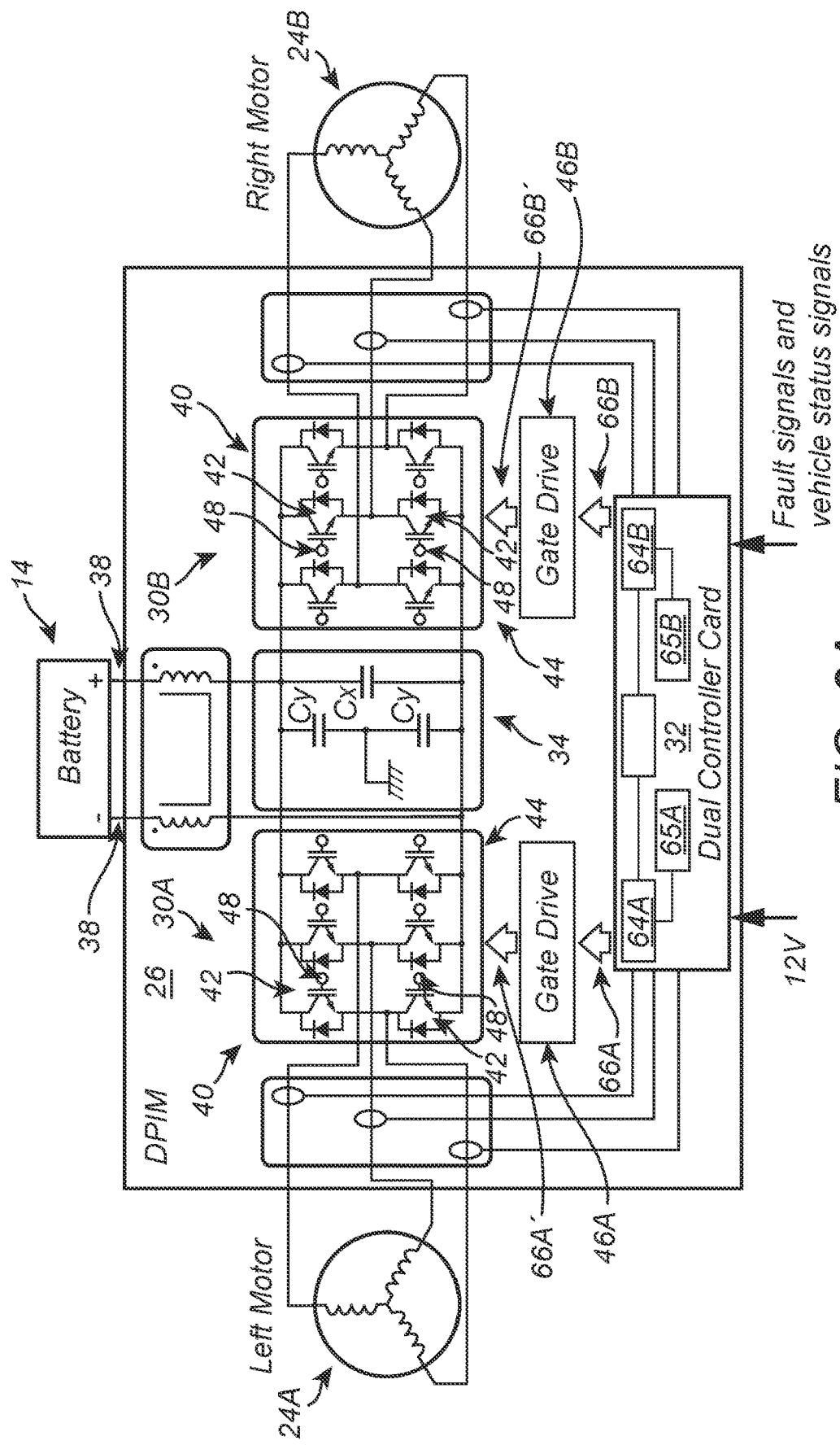
FIG. 3A is a block diagram in partial schematic form of an illustrative dual inverter with common control.
Figure 3B:
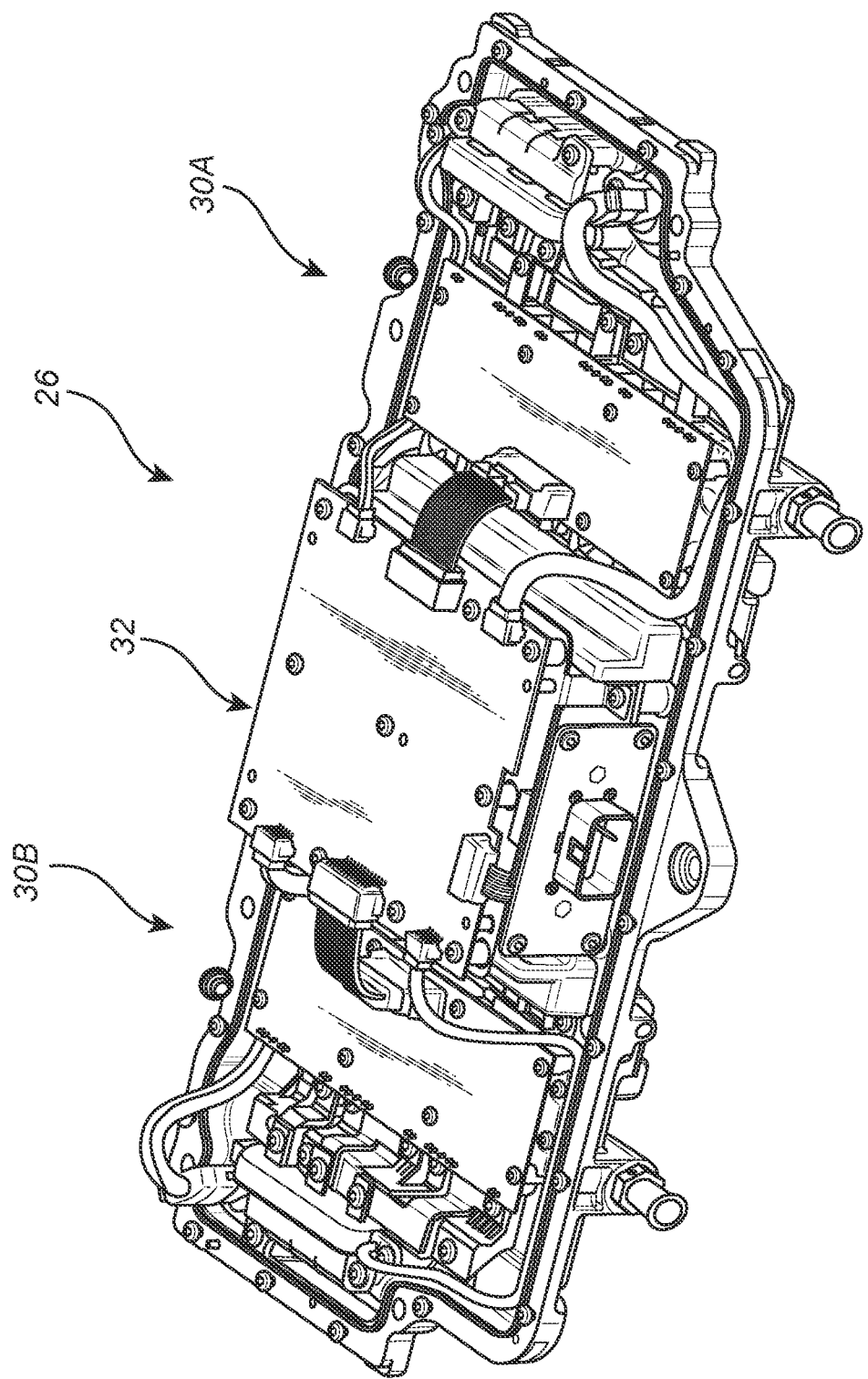
FIG. 3B is a perspective view of an illustrative dual inverter with common control.

Referring additionally to FIGS. 3A and 3B, in various embodiments a dual power inverter module (DPIM) 26 is provided. As mentioned above, in various embodiments the DPIM 26 includes two inverters 30A and 30B configured to create three-phase, high voltage AC electrical power from the high voltage DC electrical power and provide the three-phase, high voltage AC electrical power to an associated electrical motor 24A or 24B and a common controller 32 configured to control both of the inverters 30A and 30B.

In various embodiments, a DC link capacitor 34 is electrically connectable to a source of high voltage DC electrical power, such as the battery 14. In some embodiments, an electrical connection to the battery 14 may include an electrical connection 36. Suitable electrical cables 38 may be electrically connected to the electrical connection 36 and may be electrically connectable to the electrical battery 14.

In various embodiments, a power inverter 30A is electrically connectable to the DC link capacitor 34 and is configured to convert high voltage DC electrical power to three phase high voltage AC electrical power. The power inverter 30A is further configured to supply the three phase high voltage AC electrical power to an electric motor 24A, such as a right motor or a left motor. A power inverter 30B is electrically connectable to the DC link capacitor 34 and configured to convert high voltage DC electrical power to three phase high voltage AC electrical power. The power inverter 30B is further configured to supply the three phase high voltage AC electrical power to an electric motor 24B, such as the other of the left motor or right motor.

In various embodiments the common controller 32 is electrically connectable to the power inverter 30A and the power inverter 30B. The common controller 32 is configured to control the power inverter 30A and the power inverter 30B. The common controller 32 may be any suitable computer processor-based controller as desired. Given by way of example only and not of limitation, in various embodiments the common controller 32 may include a computer processing unit (CPU), a general purpose processor, a digital signal processor, a field programmable gate array, or the like, and/or any combination thereof. While controllers are well known and further description of their construction and operation are not necessary for an understanding of disclosed subject matter, further details regarding the common controller 32 will be set forth below regarding additional functions.

In various embodiments, the common controller 32 is electrically connectable to receive low voltage DC electrical power, such as 12 VDC. The common controller 32 also is electrically connectable to receive vehicle status signals and vehicle fault indication signals. Illustrative responses to various vehicle faults and to loss of 12 VDC will be discussed further below.

In various embodiments, the power inverter 30A and the power inverter 30B each include a bank 40 of three-terminal power semiconductor devices 42 and a bank 44 of the three-terminal power semiconductor devices 42.

In some embodiments, the three-terminal power semiconductor devices 42 may include insulated gate bipolar transistors (IGBTs). In some such embodiments, the IGBTs may include silicon (Si) IGBTs. In some embodiments, the three-terminal power semiconductor devices 42 may include metal-oxide-semiconductor field effect transistors (MOSFETs). In some such embodiments, the MOSFETs may include silicon carbide (SiC) MOSFETs. However, it will be appreciated that the three-terminal power semiconductor devices 42 may also include power semiconductor devices 42 that include at least three terminals and may include additional terminals—such as, for example and without limitation, Kelvin source terminal, Kelvin emitter terminal, current sense terminal, and/or temperature sense terminal.

It will be appreciated that SiC MOSFETS may offer advantages over Si IGBTs at low phase currents and that SiC MOSFETS have lower conduction drop compared to IGBTs below 700 Apk. However, it will be appreciated that this value may change depending upon size of the inverter. As such, it will be appreciated that SiC MOSFETS may offer up to around 3-5% efficiency gains over a typical drive cycle, as compared to Si IGBTs.

In some all-wheel drive (AWD) electric vehicles 10, the front wheels 16 function as the only drive wheels until additional torque and/or power beyond a predetermined amount is entailed. In such electric vehicles 10, the rear wheels are only driven by their associated drive unit 20 when torque and/or power beyond the predetermined amount is to be delivered. In some such AWD electric vehicles 10, to take advantage of efficiencies of SiC MOSFETS over Si IGBTs the drive unit 20 that drives the front wheels 16 may include inverters 40 that include SiC MOSFETS and the drive unit 20 that drives the rear wheels 18 may include inverters 40 that include Si IGBTs. However, it will be appreciated that any of the drive units 20 may include inverters 40 that include either SiC MOSFETS or Si IGBTs as desired.

In various embodiments the power inverter 30A includes a gate drive circuit 46A configured to drive gate terminals 48 of the banks 40 and 44 of three-terminal power semiconductor devices 42 of the power inverter 30A. Similarly, the power inverter 30B includes a gate drive circuit 46B configured to drive gate terminals 48 of the banks 40 and 44 of three-terminal power semiconductor devices 42 of the power inverter 30B. In various embodiments the controller 32 is configured to, among other functions, generate low-power turn on and turn off signals 66A and 66B and provide the turn on and turn off signals 66A and 66B to the gate drive circuits 46A and 46B, respectively. The low-power turn on and turn off signals 66A and 66B may be on the order of a few milliamperes of electrical current and logic level voltages such as 3.3 or 5V.

In various embodiments the gate drive circuits 46A and 46B include suitable power amplifiers that amplify the low-power turn on and turn off signals 66A and 66B and generate high-power turn on and turn off signals 66A' and 66B'. To drive the gate terminals 48, the high-power turn on and turn off signals 66A' and 66B' may be on the order of several hundreds of milliamperes of electrical current or on the order of amperes of electrical current, with voltages in the range of 15-20V, as desired for a particular application. The high-power turn on and turn off signals 66A' and 66B' are, in turn, electrically coupled to drive associated gate terminals 48. Gate drive circuits are well known and further description of their construction and operation are not necessary for an understanding of disclosed subject matter.

In view of the illustrative details provided above by way of non-limiting examples, it will be appreciated that, in various embodiments, provision of one controller 32 for two inverters 30A and 30B can provide for use of: (i) a single interface for vehicle status signals and vehicle fault indication signals; (ii) a single DC link capacitor 34; (iii) a single common controller 32; and (iv) a single interface for low voltage DC electrical power (such as 12 VDC).

In view of the illustrative details provided above by way of non-limiting examples, it will be appreciated that, in various embodiments, integrating the mounting of the DPIM 26 with the drive unit 20 can provide for integration of coolant interfaces. For example, in various embodiments water cooling provided for the inverters 30A and 30B can be provided to stator windings of the electrical motors 24A and 24B.

As discussed above, in various embodiments a single motor 24A or 24B drives a single wheel, such as one front wheel 16 or one rear wheel 18. It will be appreciated that each wheel can operate at a unique speed and torque. Given by way of non-limiting examples, going around a curve or loss of traction can create different wheel speeds and traction control or torque vectoring can result in different wheel torques. As also discussed above, in various embodiments the dual power inverter module 26 combines two inverters 30A and 30B into one module 26 and, as such, shares common components, such as the DC link capacitor 34.

To that end, various embodiments include only one DC link capacitor 34 that is electrically connectable to provide high voltage DC electrical power to both inverters 30A and 30B of the DPIM 26. It will be appreciated that it may be desirable to reduce and possibly minimize size of the DC link capacitor 34. As explained below, various embodiments can help contribute to reducing stress on the DC link capacitor 34 (that may have a reduced size) and ripple current on the DC high voltage bus (that may include the electrical cables 38) due to generation of high-frequency current harmonics from the inverters 30A and 30B.

In various embodiments, the inverters 30A and 30B use pulse width modulation (PWM) to create a variable amplitude and frequency voltage source to drive the electric motors 24A and 24B. Different PWM methods (such as, for example, continuous PWM and discontinuous PWM) can be employed as desired for a particular situation. Each of the PWM methods creates its own unique harmonic spectrum of ripple current that may be reflected on the DC bus.

For example, in continuous PWM each phase is switching continuously (that is, in various embodiments all of the three-terminal power semiconductor devices 42 in both of the inverters 30A and 30B are switching continuously). As a result, continuous PWM can result in a not-insignificant amount of switching losses in the inverters 30A and 30B. In continuous PWM, the second harmonic of the switching frequency is the dominant harmonic frequency in the ripple current. Continuous PWM (such as space vector modulation) can be used in situations such as when it is desired to minimize harmonic content and ripple on AC output and DC input currents, as well as minimize acoustic noise. For example, some vehicles might use continuous PWM at high torque to minimize acoustic noise.

As another example, in discontinuous PWM each phase is not switching continuously (that is, in various embodiments all of the three-terminal power semiconductor devices 42 in both of the inverters 30A and 30B are not switching continuously). In such embodiments, only two of the three phases are switching at any one time, and the remaining third phase has either the upper or lower switch turned on continuously, thereby helping to contribute to increasing inverter efficiency and helping to contribute to reducing losses during discontinuous PWM. It will be appreciated that use of discontinuous PWM may have other non-beneficial effects, such as increased acoustic noise or harmonic content in the AC output or DC input currents. In discontinuous PWM each phase has two 60 degree segments where the switches are held either low or high, and is not switching for a total of 120 degrees over a fundamental period. That is, in discontinuous PWM each phase is not switching one-third of the time. This results in significantly lower switching losses and higher efficiency. It will be appreciated that, while discontinuous PWM entails lower switching losses than those entailed in continuous PWM, discontinuous PWM may entail higher acoustic noise than that associated with continuous PWM and harmonics may be placed onto the motors 24A and 24B as well as the DC link capacitor 34. In discontinuous PWM, the first harmonic of the switching frequency is the dominant harmonic frequency. Discontinuous PWM can be used in situations when the highest efficiency and lowest losses are desired, and acoustic noise is not problematic. As an example, some vehicles might have thermal problems at high torque and, as a result, use discontinuous PWM to reduce losses under those conditions.

Figure 4A:
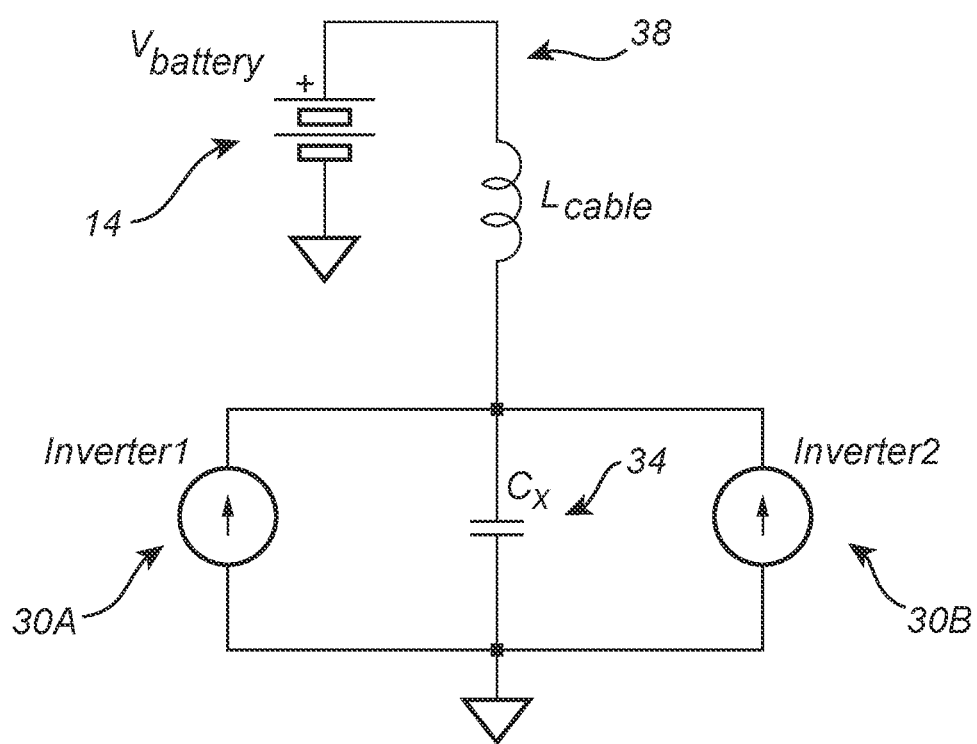
FIG. 4A is a simplified schematic diagram of an illustrative dual inverter with a common DC link capacitor.
Figure 4B:
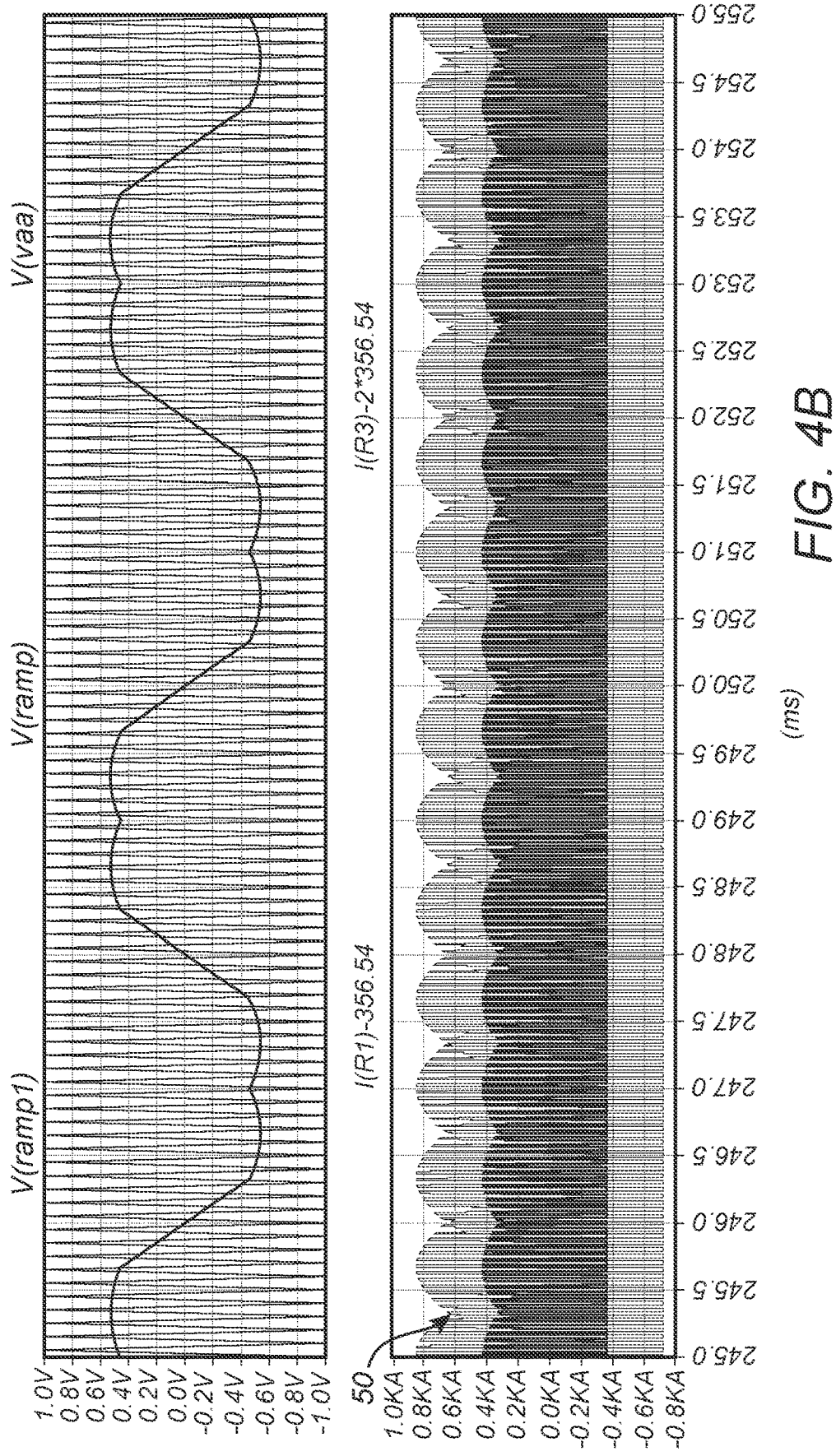
FIGS. 4B and 4C are graphs of ripple waveforms with no cancellation.
Figure 4C:
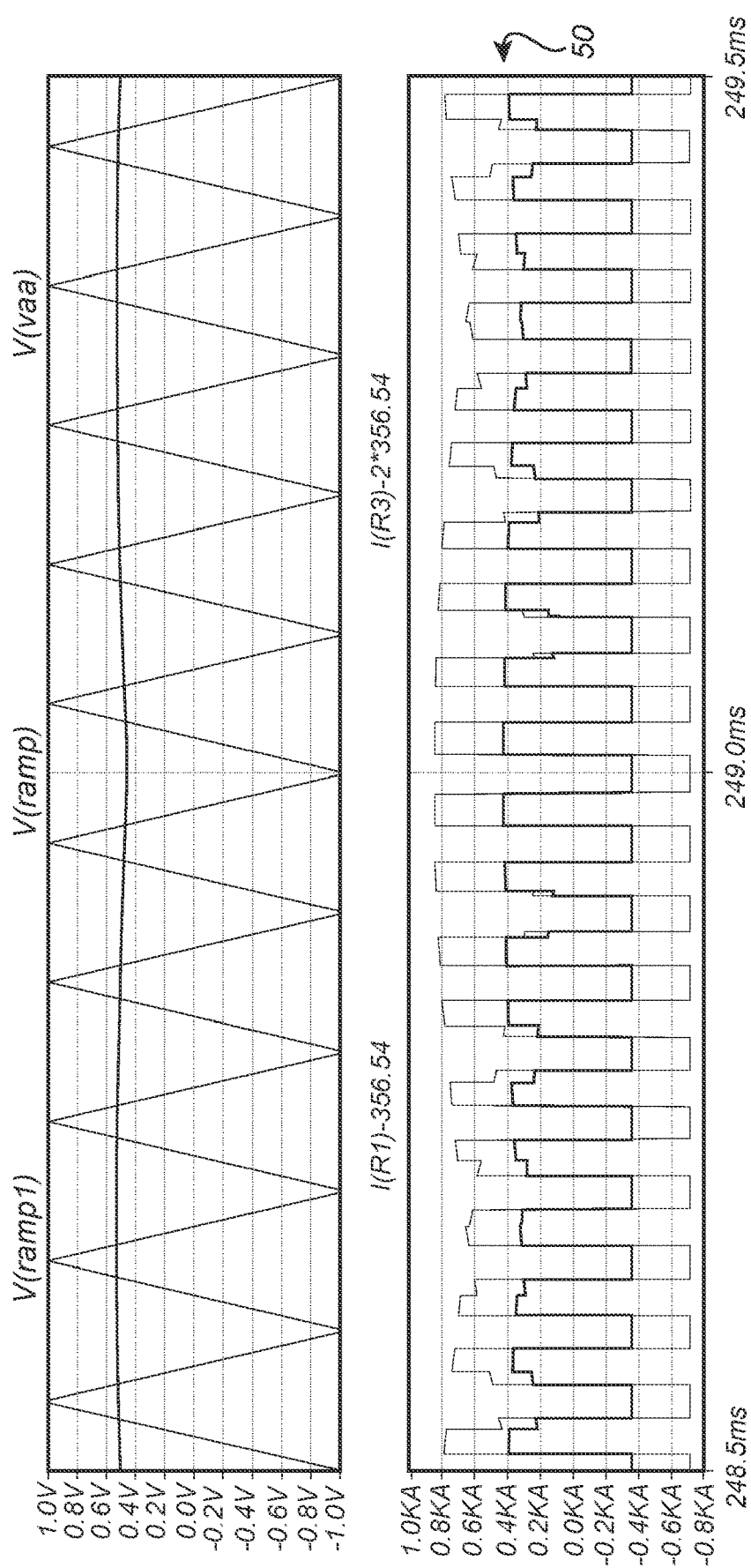

In various embodiments and referring additionally to FIG. 4A, the DC link capacitor 34 is used to decouple effects of inductance $L_{cable}$ from the DC voltage source (that is, the electrical battery 14) to the inverters 30A and 30B. Referring additionally to FIGS. 4B and 4C, the DC link capacitor 34 provides a low impedance path for ripple currents 50 that are generated by the inverters 30A and 30B and might otherwise flow back onto the DC high voltage bus. The ripple currents 50 are a factor in sizing the DC link capacitor 34 and, as a result, reducing the ripple currents 50 can help contribute to reducing size of the DC link capacitor 34 (and stress on the DC link capacitor 34). The ripple currents 50 are a result of the AC load current flowing into the motors 24A and 24B and pulse width modulation (PWM) of the inverters 30A and 30B. As shown in FIGS. 4B and 4C and given by way of illustration only and not of limitation, with a motor current of 550 Arms, a modulation index of 0.48, a power factor of 1, a switching frequency of 10 KHz, and a fundamental frequency of 250 Hz, without cancellation the ripple currents 50 can have an amplitude of around 712 Arms.

Figure 4D:
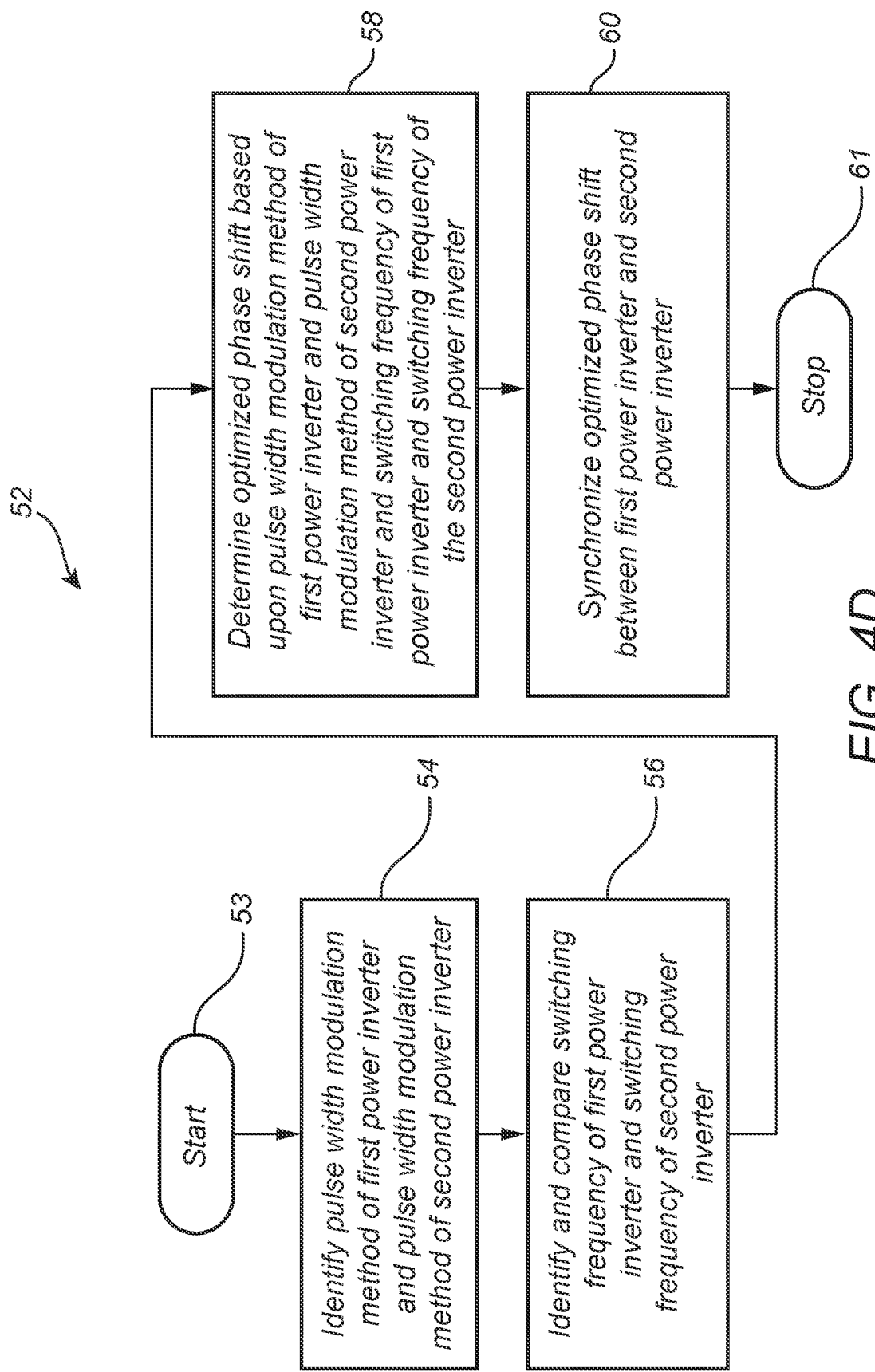
FIG. 4D is a flow chart of an illustrative method for synchronizing pulse width modulation clocks.

Referring additionally to FIG. 4D, in various embodiments a method 52 is provided for synchronizing pulse width modulation clocks. It will be appreciated that, in various embodiments, synchronizing pulse width modulation clocks can help contribute to cancelling the ripple currents 50. The method 52 begins at a block 53. At a block 54 a pulse width modulation method of a first power inverter and a pulse width modulation method of a second power inverter are identified. At a block 56, a switching frequency of the first power inverter and a switching frequency of the second power inverter are identified and compared. At a block 58, an optimized phase shift between the first power inverter and the second power inverter is determined responsive to the pulse width modulation method of the first power inverter and the pulse width modulation method of the second power inverter and the switching frequency of the first power inverter and the switching frequency of the second power inverter. At a block 60 the optimized phase shift is synchronized between the first power inverter and the second power inverter.

The method 52 ends at a block 61.

Figure 4E:
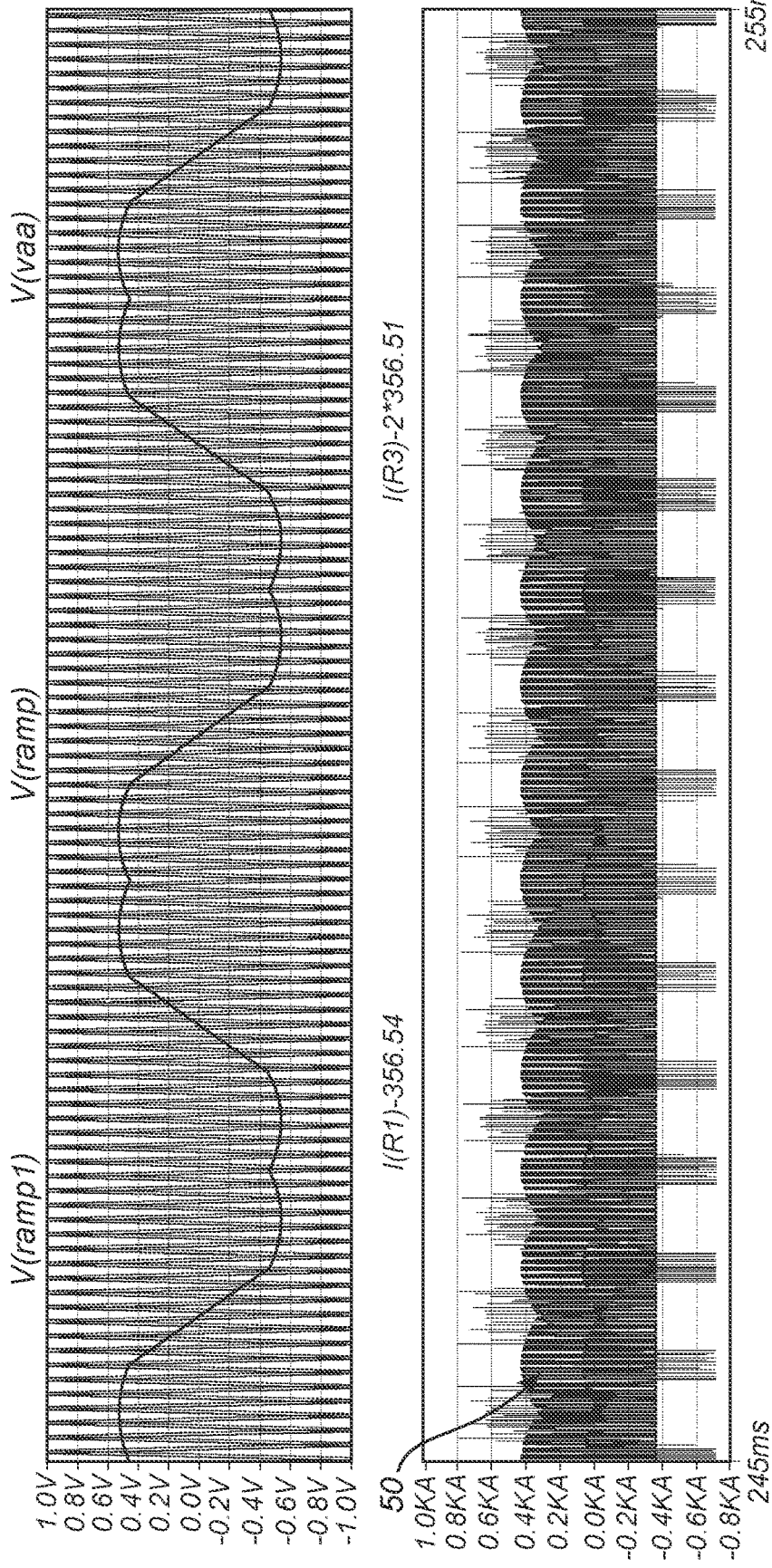
FIGS. 4E and 4F are graphs of illustrative ripple waveforms with cancellation.
Figure 4F:
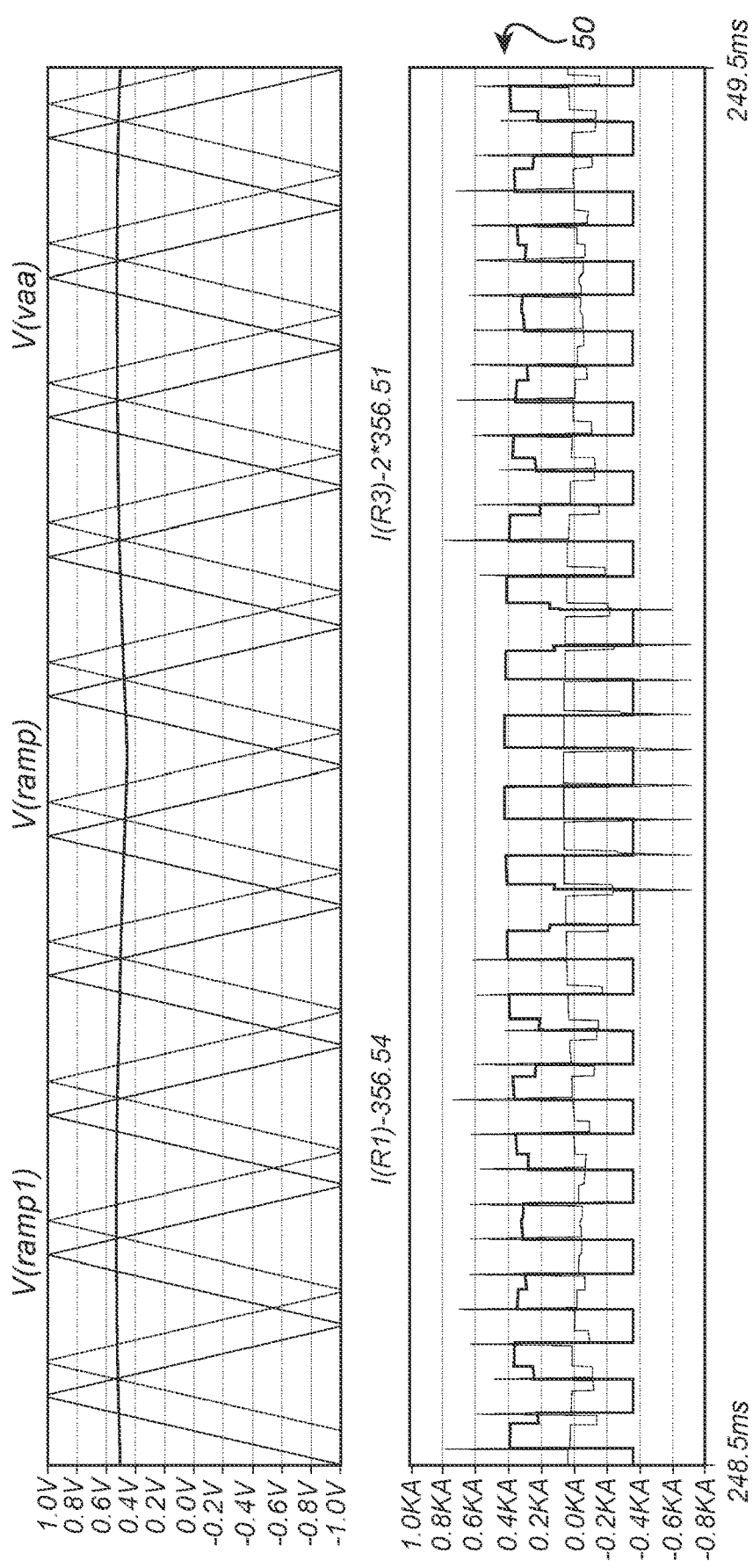

As shown in FIGS. 4E and 4F and given by way of illustration only and not of limitation, with a motor current of 550 Arms, a modulation index of 0.48, a power factor of 1, a switching frequency of 10 KHz, and a fundamental frequency of 250 Hz, with cancellation as described herein the ripple currents 50 can be reduced to have an amplitude of around 147 Arms.

With the above overview in mind, in various embodiments and as shown in FIG. 3A the common controller 32 includes a processor 64A and a processor 64B. In some embodiments the processors 64A and 64B may be separate processors. However, it will be appreciated that in some other embodiments (that use two PWM generators) the functions of the processors 64A and 64B may be combined into a single processor as desired for a particular application. Regardless of the processors 64A and 64B being separate or combined into a single processor, it will be appreciated that the processor 64A functions as a Master and the processor 64B functions as a Slave.

The processor 64A is operably coupled to computer-readable media 65A, such as any suitable computer memory, configured to store computer-executable instructions configured to cause the processor 64A to perform functions described below. The processor 64B is operably coupled to computer-readable media 65B, such as any suitable computer memory, configured to store computer-executable instructions configured to cause the processor 64B to perform functions described below. The processor 64A is configured to generate a first clock signal (e.g., using a crystal) for controlling generation of the turn on and turn off signal 66A for driving the power inverter 30A and a second clock signal. The second clock signal is provided to the processor 64B for controlling generation of the turn on and turn off signal 66B for driving the power inverter 30B.

The processor 64A selects a PWM method for the power inverter 30A and the processor 64B selects a PWM method for the power inverter 30B. The processor 64B (that is, the Slave) informs the processor 64A (that is, the Master) of its PWM method (except for cases where switching of PWM methods is not employed). Factors for selection of continuous PWM and discontinuous PWM have been discussed above.

The processor 64A selects a switching frequency for the power inverter 30A and the processor 64B selects a switching frequency for the power inverter 30B. The frequencies are even multiples of each other, and are selected from predetermined values. Given by way of illustration only and not of limitation, in various embodiments the switching frequencies may be 2.5 KHz and 10 KHz, thereby resulting in an even multiple of four. However, it will be appreciated that other frequencies may be selected as desired (that result in even multiples). In various embodiments the processor 64A (that is, the Master) puts out a reference that is at the lowest selectable frequency, with the desired phase shift as a function of the PWM modes.

The processor 64A is configured to determine an optimized phase shift between the power inverter 30A and the power inverter 30B responsive to the PWM method of the power inverter 30A and the PWM method of the power inverter 30B and the switching frequency of the power inverter 30A and the switching frequency of the power inverter 30B. For example, in some such embodiments and referring additionally to FIG. 4G, the processor 64A may access a look-up-table 68 that is populated with cells that include values of optimized phase shift arranged according to rows 70 of PWM method and columns 72 of PWM method. It will be appreciated that, in some embodiments, the PWM method of the power inverter 30A and the PWM method of the power inverter 30B may be the same pulse width modulation method. It will also be appreciated that, in some other embodiments, the PWM method of the power inverter 30A and the PWM method of the power inverter 30B may be different PWM methods.

Figure 4G:
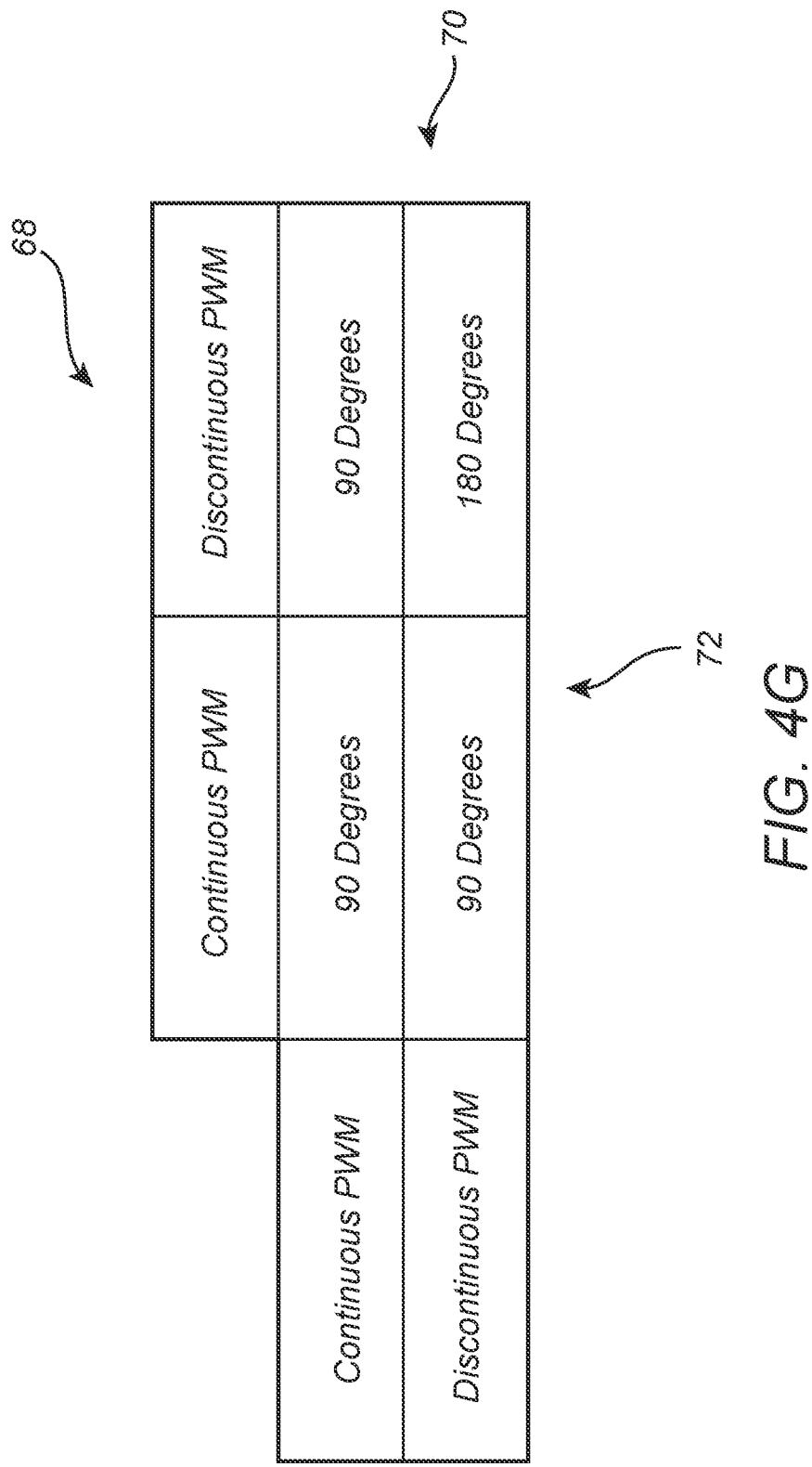
FIG. 4G illustrates a look-up table.

As shown in FIG. 4G, when both of the power inverters 30A and 30B use continuous PWM, the phase shift is set to 90 degrees. When both of the power inverters 30A and 30B use discontinuous PWM, the phase shift is set to 180 degrees. In the event of different PWM methods, the phase is set to 90 degrees.

In some other such embodiments, the processor 64A may execute an algorithm for determining an optimized phase shift between the power inverter 30A and the power inverter 30B responsive to the PWM method of the power inverter 30A and the PWM method of the power inverter 30B. For example, the algorithm may include if-then statements, such as:

if both PWM methods are continuous PWM, then the optimized phase shift is 90 degrees;

if both PWM methods are discontinuous PWM, then the optimized phase shift is 180 degrees; and if one PWM method is continuous PWM and another PWM method is discontinuous PWM, then the optimized phase shift is 90 degrees.

The processor 64A is also configured to synchronize the optimized phase shift between the power inverter 30A and the power inverter 30B. As mentioned above, the processor 64B is configured to receive the second clock signal and to drive the power inverter 30B.

In various embodiments, the processor 64A is further configured to shift the second clock signal from the first clock signal by the determined optimized phase shift.

In various embodiments, the processor 64A is further configured to identify a dominant harmonic frequency among harmonic frequencies of the PWM method of the power inverter 30A and the PWM method of the power inverter 30B and to determine the optimized phase shift between the power inverter 30A and the power inverter 30B responsive to the dominant harmonic frequency among the harmonic frequencies of the PWM method of the power inverter 30A and the PWM method of the power inverter 30B. It will be appreciated that determining the optimized phase shift between the power inverter 30A and the power inverter 30B responsive to the dominant harmonic frequency among the harmonic frequencies of the PWM method of the power inverter 30A and the PWM method of the power inverter 30B can help contribute to cancelling dominant high frequency components of the ripple currents 50.

In some such embodiments, the dominant harmonic frequency may include a second harmonic frequency (harmonic of the switching frequency). For example, in such embodiments the PWM method may include continuous PWM. In such embodiments, the optimized phase shift is 90 degrees. It will be appreciated that a phase shift of 90 degrees shifts the dominant harmonic (second harmonic frequency) by 180 degrees, thereby resulting in cancellation of the dominant harmonic component of the ripple current 50.

In some other such embodiments, the dominant harmonic frequency may include a first harmonic frequency. For example, in such embodiments the PWM method may include discontinuous PWM. In such embodiments, the optimized phase shift is 180 degrees. It will be appreciated that a phase shift of 180 degrees shifts the dominant harmonic (first harmonic frequency) by 180 degrees, thereby resulting in cancellation of the dominant harmonic component of the ripple current 50.

It will be appreciated that actual DC bus harmonics may reside in side band groups surrounding the switching frequency. The separation of these harmonics from the switching frequency harmonic is a function of the motor fundamental frequency.

In various embodiments the processor 64A is configured to identify and compare a switching frequency of the power inverter 30A and a switching frequency of the power inverter 30B. As discussed above, only two frequencies that are even multiples of each other are used.

For example, in some embodiments it may be desirable to change switching frequency. For example, in some embodiments switching frequency may be 10 KHz. In such embodiments, at low motor speed (for example, below 500 RPM) it may be desirable to reduce switching frequency to 2.5 KHz to protect the switches 42 in the inverters 30A and 30B, thereby helping to reduce stresses in the inverters 30A and 30B. Maintaining even multiple relation between the switching frequencies allows for alignment of harmonics and increased opportunity for cancellation of dominant harmonics.

Electric vehicles in which each wheel is independently driven by its own associated electrical motor via its own axle does not have any mechanical coupling between the wheels. In such vehicles, if one inverter shuts down due to a fault and the other inverter does not react appropriately, then a torque difference might exist between the two wheels. Such a resultant torque difference might have negative impact on controllability of the vehicle.

To help avoid such a torque difference and referring additionally to FIGS. 5A-5G, in various embodiments a fault that is associated with either the power inverter 30A or the power inverter 30B (or circuitry described below that is associated with both the inverters 30A and 30B) results in application of a same fault action (described below) to both the inverters 30A and 30B. In such embodiments, application of the same fault action to both the inverters 30A and 30B puts both the inverters 30A and 30B in a "safe state" and helps contribute to applying an equalized torque to both of the wheels associated with the drive unit 20 that includes the inverters 30A and 30B. By applying the same fault action to both the inverters 30A and 30B and equalizing torque to both of the wheels associated with the drive unit 20 that includes the inverters 30A and 30B, various embodiments are able to help contribute to reducing the possibility of generation of torque difference that might have negative impact on controllability of the vehicle.

As discussed above, the processor 64A is operably coupled to computer-readable media 65A, such as any suitable computer memory, configured to store computer-executable instructions configured to cause the processor 64A to perform functions described below. As also discussed above, the processor 64B is operably coupled to computer-readable media 65B, such as any suitable computer memory, configured to store computer-executable instructions configured to cause the processor 64B to perform functions described below. In various embodiments and as will be described below, the computer-executable instructions are configured to cause its associated processor 64A and 64B to apply a same fault action to the power inverter 30A and the power inverter 30B, respectively, for applying equalized torque to each wheel 16 or 18 operatively coupled to the drive unit 20 responsive to a fault associated with the power inverter 30A or the power inverter 30B

Figure 5A:
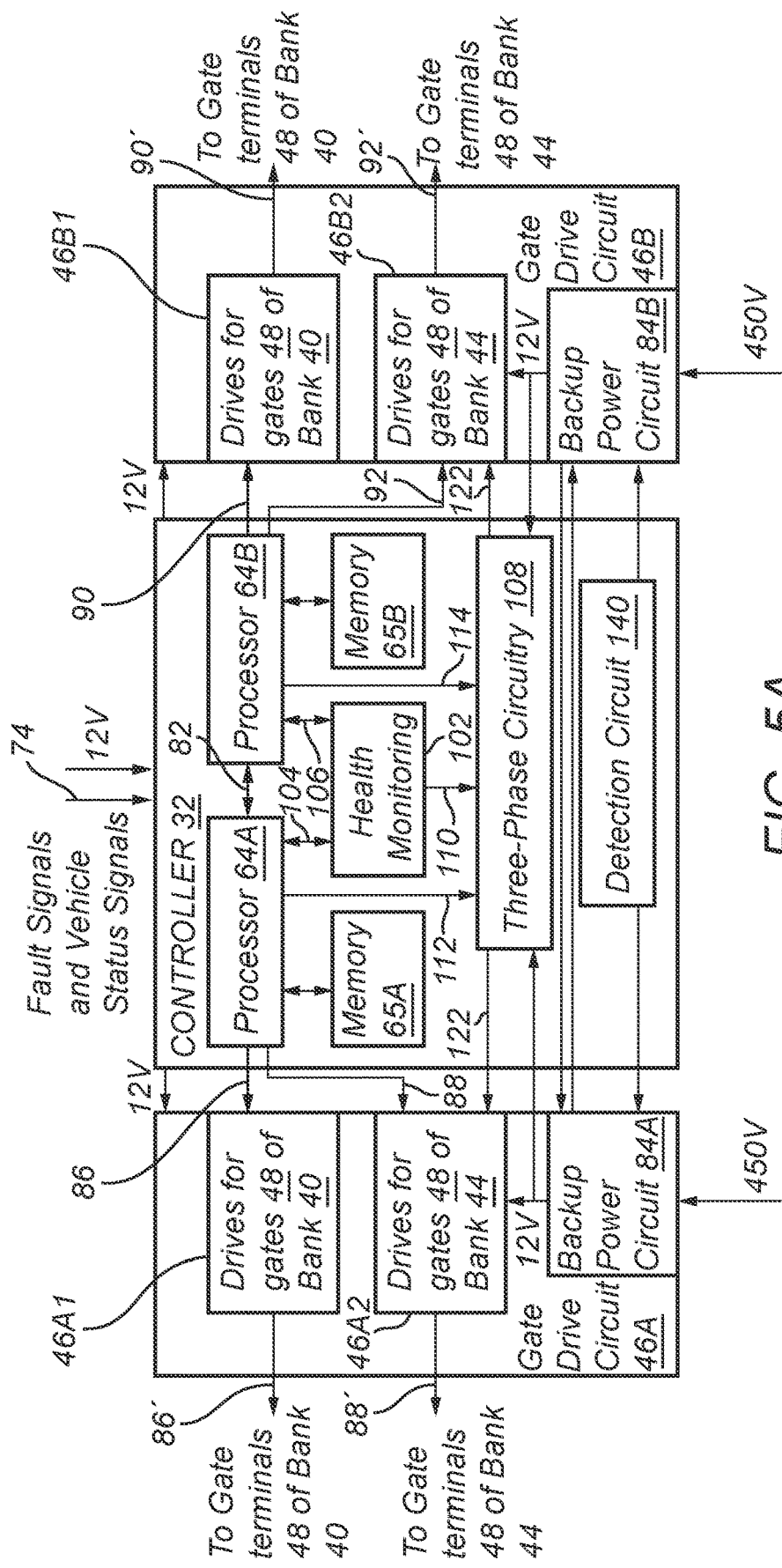
FIG. 5A is a block diagram of illustrative components configured to place both inverters of a drive unit in a safe state responsive to a detected fault associated with either inverter.

In various embodiments and as shown in FIG. 5A, various faults associated with the inverters 30A and 30B are monitored by the processors 64A and 64B for the inverters 30A and 30B, respectively. For such faults, in various embodiments the same fault response is applied by the processors 64A and 64B to the three-terminal power semiconductor devices 42 (FIG. 3A) of both of the inverters 30A and 30B. In various embodiments, such faults associated with the inverters 30A and 30B and monitored by the processors 64A and 64B, respectively, may include, without limitation, overcurrent, overvoltage, undervoltage, over temperature, overspeed, and the like. In various embodiments, signals indicative of such faults may be provided to the controller 32 via a data link 74 that may include any suitable data communication connection or network as desired, such as without limitation a wide area network (WAN), a local area network (LAN), a controller area network (CAN), a peer-to-peer network, a data bus, or the like and provided to the processors 64A and 64B. In various embodiments, signals indicative of vehicle status, such as motor speed and voltage of the battery 14, are also provided to the controller 32 via the data link 74.

In various embodiments and as also shown in FIG. 5A, the controller 32 includes a communications link 82 between the processors 64A and 64B. It will be appreciated that the communications link 82 can enable the processor 64A or the processor 64B to communicate to the other processor 64B or 64A, respectively, that a fault monitored by the processor 64A or the processor 64B has been detected, that a fault action is to be taken, and what fault action is to be taken. The communications link 82 may include any suitable data link or data bus as desired.

In various embodiments, the fault action for a fault monitored by the processors 64A and 64B for the inverters 30A and 30B, respectively, may include an action such as opening all of the three-terminal semiconductor devices 42 of the inverters 30A and 30B and/or shorting the three-terminal semiconductor devices 42 of either the bank 40 or the bank 44 of the inverters 30A and 30B. As will be explained below, in various embodiments the fault action applied to both of the inverters 30A and 30B for a fault monitored by the processors 64A and 64B depends on speed of the motors. As will also be explained below, the fault action applied to both of the inverters 30A and 30B for a fault that is not monitored by the processors 64A and 64B does not depend on speed of the motors.

In various embodiments and as mentioned above, in various embodiments the fault action for a fault monitored by the processors 64A and 64B for the inverters 30A and 30B, respectively, may include an action such as opening all of the three-terminal semiconductor devices 42 of the inverters 30A and 30B and/or shorting the three-terminal semiconductor devices 42 of either the bank 40 or the bank 44 of the inverters 30A and 30B and may depend on speed of the motors. For such faults that are monitored by the processors 64A and 64B, it will be appreciated that the fault action applied to both of the inverters 30A and 30B simultaneously can help contribute to reducing braking torque and reducing regenerative electrical current to the electrical battery 14. Because the processors 64A and 64B are operatively coupled to various data communication connections or networks to receive data regarding speed of the motors, the processors 64A and 64B suitably are configured to determine the same fault action to be applied based on speed of the motors. In various embodiments, the processor 64A selects the appropriate speed-dependent fault action for its associated electrical motor 24A and the processor 64B selects the appropriate speed-dependent fault action for its associated electrical motor 24B. Fault actions for other faults—that are not monitored by the processors 64A and 64B—do not depend on speed of the motors and are discussed further below.

Figure 5B:
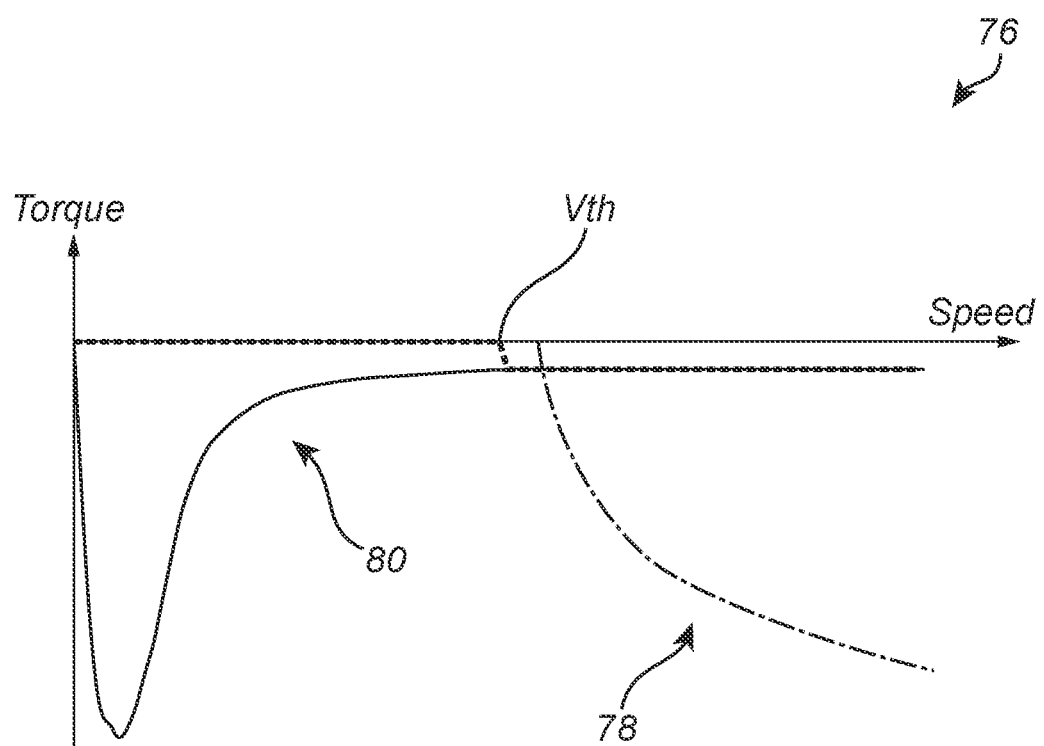
FIG. 5B is a graph of torque versus speed.

As shown in FIG. 5B, in various embodiments the same fault action to be applied the inverters 30A and 30B may be based on speed of the motors. In such embodiments the same fault action may include opening all of the three-terminal semiconductor devices 42 of the inverters 30A and 30B below a threshold speed $v_{th}$ of the motor and shorting the three-terminal semiconductor devices 42 of either the bank 40 or the bank 44 of the inverters 30A and 30B above the threshold speed $v_{th}$.

As shown in FIG. 5B, a graph 76 plots speed of the motor versus torque for various conditions of the three-terminal semiconductor devices 42 of the inverters 30A and 30B. A curve 78 shows torque that results from opening all of the three-terminal semiconductor devices 42 of the inverters 30A and 30B. Below the threshold speed $v_{th}$ torque is substantially insignificant and above the threshold speed $v_{th}$ braking torque becomes increasingly significant with increased speed of the motors. It will also be appreciated that, in such instances, back electromotive force (back EMF) increases with increasing speed of the motors which can, in some instances, result in the electrical motors 24A and 24B possibly operating as uncontrolled generators that can generate back EMF and apply unwanted regenerated electrical current to the DC link capacitor 34 and the electrical battery 14.

As also shown in FIG. 5B, a curve 80 shows torque that results from a three-phase short of the three-terminal semiconductor devices 42 of either the bank 40 or the bank 44 of three-terminal semiconductor devices 42. As speed of the motors increases from zero, braking torque rapidly increases and reaches a maximum value of braking torque. As speed of the motors continues to increase, braking torque decreases and approaches an asymptotic minimized value before the speed of the motors reaches the threshold speed $v_{th}$.

Thus, in various embodiments in which the fault is monitored by the processors 64A and 64B for the inverters 30A and 30B, the fault action suitably includes a speed-dependent fault action that can help contribute to simultaneously minimize braking torque and unwanted regenerative electrical current to the DC link capacitor 34 and the electrical battery 14. In such embodiments, the fault action suitably includes opening all of the three-terminal power semiconductor devices 42 of both of the inverters 30A and 30B when the speed of the motors is less than the threshold speed $v_{th}$ and shorting the three-terminal power semiconductor devices 42 of one bank of the three-terminal power semiconductor devices 42 (that is, either the bank 40 or the bank 44) of the inverters 30A and 30B when the speed of the motors is greater than the threshold speed $v_{th}$.

In various embodiments, fault actions based on the curve 78 and the graph 80 may be implemented using back EMF and voltage of the battery 14 (as opposed to taking fault action directly in response to reported motor speed). For example, in various embodiments motor back EMF is computed and is compared to voltage of the battery. In such embodiments, when back EMF is less than battery voltage (by a design safety margin selected as desired), then a speed-dependent fault action includes opening all of the three-terminal power semiconductor devices 42 of both of the inverters 30A and 30B. When back EMF exceeds a predetermined percentage of battery voltage, then a speed-dependent fault action includes shorting the three-terminal power semiconductor devices 42 of one bank of the three-terminal power semiconductor devices 42 (that is, either the bank 40 or the bank 44) of the inverters 30A and 30B. If desired, use of an amount of hysteresis can prevent "chattering" back-and-forth between different fault actions.

As shown in FIG. 5A, the processor 64A is associated with the power inverter 30A and the processor 64B is associated with the power inverter 30B. The memory 65A (that is, computer-readable media) and the memory 65B (again, computer-readable media) each are configured to store computer-executable instructions configured to cause its associated processor 64A and 64B, respectively, to apply the same fault action to the power inverter 30A and the power inverter 30B for applying equalized torque to each wheel 16 or 18 operatively coupled to the drive unit 20 responsive to a fault associated with the power inverter 30A or the power inverter 30B.

As also shown in FIG. 5A, in various embodiments signals that are indicative of parameters such as vehicle speed, faults such as those described above, and the like are supplied to the controller 32 via the data link 74 and are provided to the processors 64A and 64B. In such embodiments the computer-executable instructions are further configured to cause its associated processor 64A or 64B to monitor for the fault.

Low-voltage DC electrical power (such as 12V) is provided to the controller 32 for powering components as desired. The controller 32, in turn, provides 12V DC electrical power to the gate drive circuits 46A and 46B.

As shown in FIG. 5A, the processor 64A is operatively coupled to provide a control signal 86 to drives 46A1 for the gates 48 of the bank 40 (sometimes referred to as an "upper bank") and a control signal 88 to drives 46A2 for the gates 48 of the bank 44 (sometimes referred to as a "lower bank"). Similarly, the processor 64B is operatively coupled to provide a control signal 90 to drives 46B1 for the gates 48 of the bank 40 (sometimes referred to as an "upper bank") and a control signal 92 to drives 46B2 for the gates 48 of the bank 44 (sometimes referred to as a "lower bank"). In various embodiments the drives 46A1, 46A2, 46B1, and 46B2 are suitable power amplifiers that amplify the low-power control signals 86, 88, 90, and 92 and generate high-power, fault action signals 86', 88', 90', and 92' that are, in turn provided to their associated gate terminals 48.

Figure 5C:
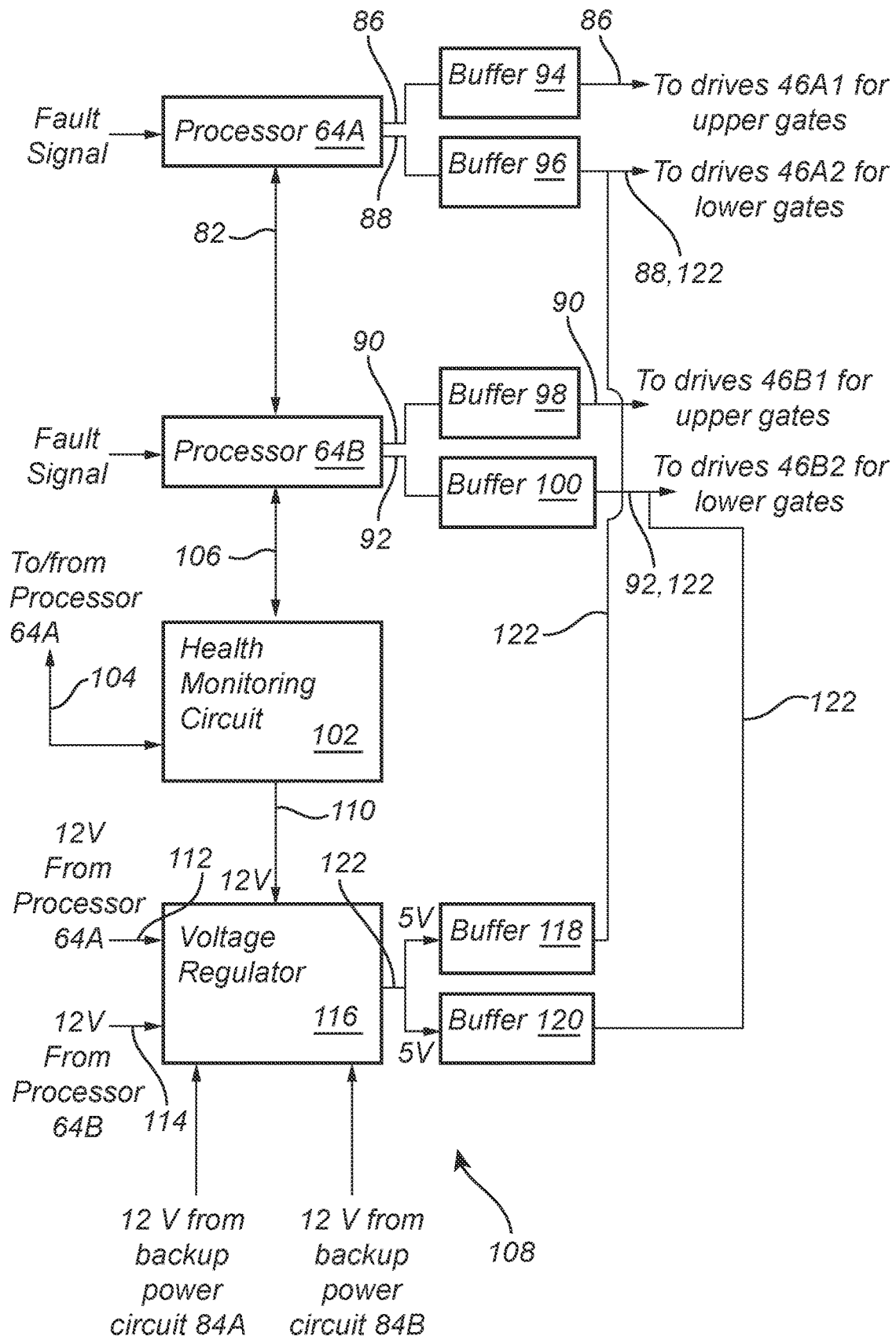
FIG. 5C is a block diagram of details of components of FIG. 5A.

As shown in FIG. 5C, in various embodiments additional circuitry is entailed in providing the control signals 86, 88, 90, and 92 to their respective drives 46A1, 46A2, 46B1, and 46B2. Each processor 64A and 64B is operatively coupled to receive the fault indication signal as discussed above, and the processors 64A and 64B are operatively coupled with each other via the communications link 82. The processor 64A is operatively coupled to provide the control signals 86 and 88 to buffers 94 and 96, respectively, and the processor 64B is operatively coupled to provide the control signals 90 and 92 to buffers 98 and 100, respectively. The buffers 94, 96, 98, and 100 are any suitable buffer, such as without limitation an octal buffer or the like.

The buffer 94 is operatively coupled to the drives 46A1, the buffer 96 is operatively coupled to the drives 46A2, the buffer 98 is operatively coupled to the drives 46B1, and the buffer 100 is operatively coupled to the drives 46B2. When a monitored fault indication signal for an associated inverter 30A or 30B is received by either the processor 64A or the processor 64B, the processor that receives the monitored fault indication signal communicates existence of the monitored fault via the communications link 82. Fault actions are taken as follows.

When the processor 64A receives a fault indication signal, the processor 64A communicates to the processor 64B via the communications link 82 that a fault monitored by the processor 64A has been detected, that a fault action is to be taken by the processor 64B, and (as discussed below) what fault action is to be taken by the processor 64B. Conversely, when the processor 64B receives a fault indication signal, the processor 64B communicates to the processor 64A via the communications link 82 that a fault monitored by the processor 64B has been detected, that a fault action is to be taken by the processor 64A, and (as discussed below) what fault action is to be taken by the processor 64A. It will also be appreciated that in various embodiments the processor that receives the fault indication signal also performs the fault action (that it asks the other processor to take as well).

Figure 5D:
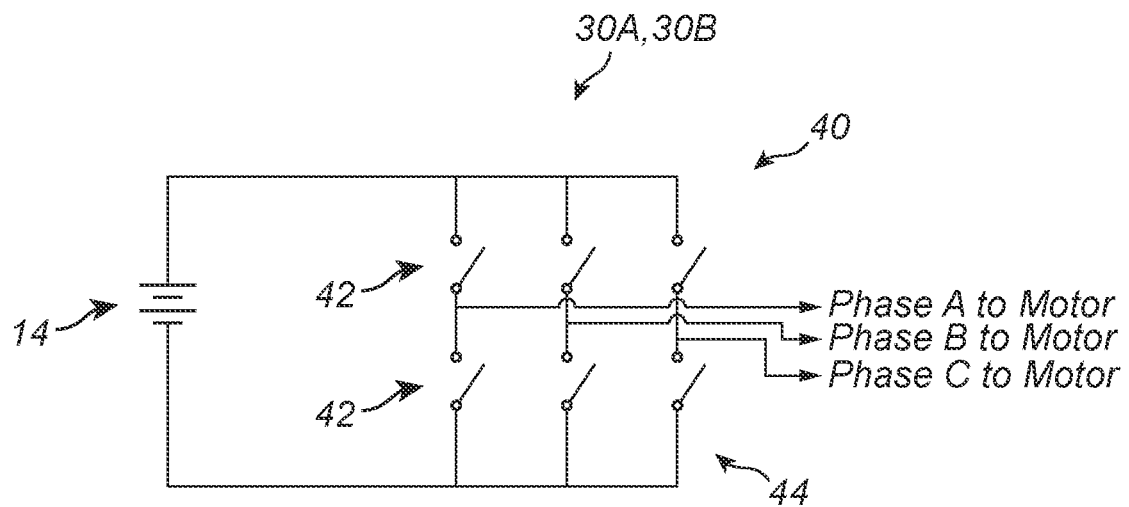
FIG. 5D is a simplified schematic diagram of open upper and lower banks of three-terminal power semiconductor devices.

When speed of the motors is less than the threshold speed $v_{th}$ (or back EMF is less than voltage of the battery 14 by at least a design safety margin) and a fault has been detected, the processors 64A and 64B generate the control signals 86, 88, 90, and 92 that are configured to turn off all the gate terminals 48 of the inverters 30A and 30B and, as a result, cause all of the three-terminal power semiconductor devices 42 of the inverters 30A and 30B to open. The control signals 86, 88, 90, and 92 are provided to the buffers 94, 96, 98, and 100, respectively, and are, in turn, provided to the drives 46A1, 46A2, 46B1, and 46B2 which provide the fault action signals 86', 88', 90', and 92' to all the gate terminals 48 of the inverters 30A and 30B. As shown in FIG. 5D, all of the three-terminal power semiconductor devices 42 in the banks 40 and 44 of the inverters 30A and 30B are caused to open.

When speed of the motors is greater than the threshold speed $v_{th}$ (or back EMF exceeds a predetermined percentage of battery voltage) and a fault has been detected, the processors 64A and 64B generate the control signals 86, 88, 90, and 92 that are configured to turn off the gate terminals 48 of the three-terminal power semiconductor devices 42 in one of the banks 40 or 44 of the inverters 30A and 30B and turn on the gate terminals 48 of the three-terminal power semiconductor devices 42 in the other of the banks 44 or 40 of the inverters 30A and 30B. As a result, the three-terminal power semiconductor devices 42 of one of the banks 40 or 44 of both of the inverters 30A and 30B are caused to open and the three-terminal power semiconductor devices 42 of the other of the banks 44 or 40 of both of the inverters 30A and 30B are caused to short.

Figure 5E:
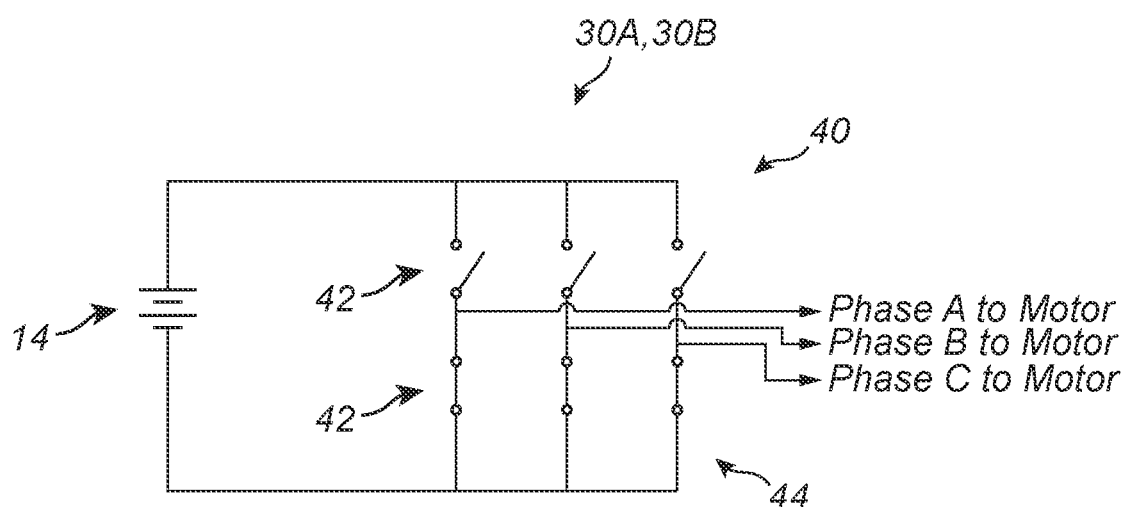
FIG. 5E is a simplified schematic diagram of a shorted lower bank of three-terminal power semiconductor devices.

It will be appreciated that the three-terminal power semiconductor devices 42 of either of the banks 40 or 44 of both of the inverters 30A and 30B may be caused to open or short as desired. It will also be appreciated that three-terminal power semiconductor devices 42 that have faulted will not be caused to open or short (because they have faulted). In some embodiments and as shown in FIG. 5E, the three-terminal power semiconductor devices 42 of the bank 40 of both of the inverters 30A and 30B are caused to open and the three-terminal power semiconductor devices 42 of the bank 44 of both of the inverters 30A and 30B are caused to short. In such embodiments, the processors 64A and 64B generate the control signals 86 and 90 that are configured to turn off all the gate terminals 48 in the bank 40 of the inverters 30A and 30B and, as a result, cause all of the three-terminal power semiconductor devices 42 in the bank 40 of the inverters 30A and 30B to open. The processors 64A and 64B also generate the control signals 88 and 92 that are configured to turn on all the gate terminals 48 in the bank 44 of the inverters 30A and 30B and, as a result, cause all of the three-terminal power semiconductor devices 42 in the bank 44 of the inverters 30A and 30B to short. The control signals 86, 88, 90, and 92 are provided to the buffers 94, 96, 98, and 100, respectively, and are, in turn, provided to the drives 46A1, 46A2, 46B1, and 46B2 which provide the fault action signals 86', 88', 90', and 92' to all the gate terminals 48 of the inverters 30A and 30B.

Figure 5F:
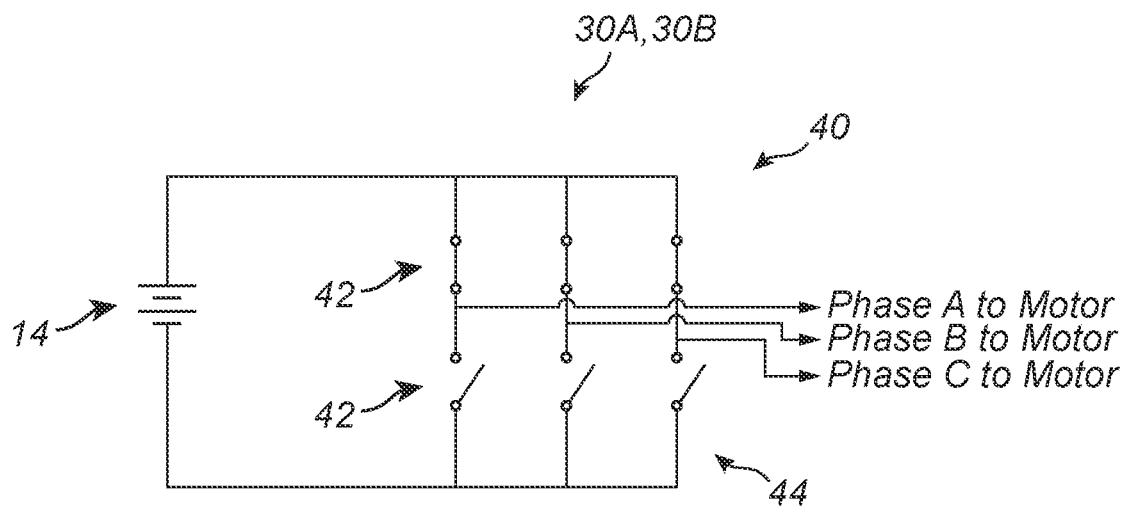
FIG. 5F is a simplified schematic diagram of a shorted upper bank of three-terminal power semiconductor devices.

In some other embodiments and as shown in FIG. 5F, the three-terminal power semiconductor devices 42 of the bank 44 of both of the inverters 30A and 30B are caused to open and the three-terminal power semiconductor devices 42 of the bank 40 of both of the inverters 30A and 30B are caused to short. In such embodiments, the processors 64A and 64B generate the control signals 86 and 90 that are configured to turn off all the gate terminals 48 in the banks 44 of the inverters 30A and 30B and, as a result, cause all of the three-terminal power semiconductor devices 42 in the bank 44 of the inverters 30A and 30B to open. The processors 64A and 64B also generate the control signals 88 and 92 that are configured to turn on all the gate terminals 48 in the bank 40 of the inverters 30A and 30B and, as a result, cause all of the three-terminal power semiconductor devices 42 in the bank 40 of the inverters 30A and 30B to short. The control signals 86, 88, 90, and 92 are provided to the buffers 94, 96, 98, and 100, respectively, and are, in turn, provided to the drives 46A1, 46A2, 46B1, and 46B2 which provide the fault action signals 86', 88', 90', and 92' to all the gate terminals 48 of the inverters 30A and 30B.

In various embodiments and as also shown in FIGS. 5A and 5C, various faults associated with the inverters 30A and 30B are not monitored by the processors 64A and 64B for the inverters 30A and 30B, respectively—because such faults are faults in one or both of the processors 64A and/or 64B or circuitry (discussed below) associated with the processors 64A and 64B. For such faults, in various embodiments the same fault response is applied to the three-terminal power semiconductor devices 42 (FIG. 3A) of both of the inverters 30A and 30B by causing the three-terminal power semiconductor devices 42 (FIG. 3A) of one of the banks 40 or 44 of both of the inverters 30A and 30B to short. Because the functionality of the processors 64A and 64B is not verifiable in such fault conditions, it is not verifiable that the processors 64A and 64B are able to receive and process information regarding speed of the motors (or back EMF or voltage of the battery 14). As a result, a default fault action is entailed in such instances. In various embodiments, that default action is a three-phase short of the three-terminal power semiconductor devices 42 in one of the banks 44 or 40 of both of the inverters 30A and 30B.

In various embodiments and as shown in FIGS. 5A AND 5C, the controller 32 includes health monitoring circuitry 102 configured to monitor health of the processors 64A and 64B via data links 104 and 106, respectively. In some such embodiments the health monitoring circuitry 102 includes a field programmable gate array ("FPGA"). In such embodiments, the health monitoring circuitry 102 may be programmed to perform a safety check, such as a safety handshaking check, and to monitor whether the processors 64A and/or 64B are functioning properly (or functioning at all). In some such embodiments, the health monitoring circuitry 102 may be programmed to implement a rolling counter to perform such monitoring of the processors 64A and 64B. In some such embodiments, the processors 64A and 64B also monitor whether the health monitoring circuitry 102 is functioning. As such, a fault in the health monitoring circuitry 102 is considered to be a fault in circuitry associated with the processors 64A and 64B.

In various embodiments and as also shown in FIGS. 5A and 5C, the controller 32 includes three-phase short circuitry 108. In such embodiments, the three-phase short circuitry 108 is configured to generate fault action signals (discussed below) for faults that are not monitored by the processors 64A and 64B—because the faults may include faults in the processors 64A and/or 64B and/or the health monitoring circuitry 102. The fault action signals generated by the three-phase short circuitry 108 causes the same fault response to be applied to the three-terminal power semiconductor devices 42 (FIG. 3A) of both of the inverters 30A and 30B by causing the three-terminal power semiconductor devices 42 (FIG. 3A) of one of the banks 40 or 44 of both of the inverters 30A and 30B to short.

In various embodiments, the three-phase short circuitry 108 is external to the processors 64A and 64B and is configured to apply a same fault action to the power inverter 30A and the power inverter 30B for applying equalized torque to each wheel 16 or 18 operatively coupled to the drive unit 20 responsive to a fault not monitored by the 64A processor or the processor 64B. As shown in FIGS. 5A and 5C, the three-phase short circuitry 108 is coupled to receive a control signal 110 from the health monitoring circuitry 102, a control signal 112 from the processor 64A, and a control signal 114 from the processor 64B. The health monitoring circuitry 102 is configured to generate the control signal 110 responsive to receiving a processor fault indication signal, indicative of a fault within the processor 64A, from the processor 64A via the data link 104 or receiving a processor fault indication signal, indicative of a fault within the processor 64B, from the processor 64B via the data link 106. The processors 64A and 64B are configured to generate the control signals 112 and 114, respectively, responsive to detecting failure of the health monitoring circuitry 102 (such as, without limitation, failure of the rolling counter) via the data links 104 and 106, respectively.

In various embodiments and as shown in FIG. 5C, the three-phase short circuitry 108 includes a voltage regulator 116, a buffer 118, and a buffer 120. In some such embodiments, the voltage regulator 116 includes a voltage regulator configured to convert 12 VDC to 5 VDC. In such embodiments, the control signals 110, 112, and 114 suitably are 12 VDC signals. In response to application of any of the 12 VDC control signals 110, 112, or 114, the voltage regulator 116 outputs a 5 VDC control signal 122. The control signal 122 is input to the buffers 118 and 120. The buffer 118 is coupled to provide the control signal 122 to the drives 46A2 for the bank 44 of the power inverter 30A. The drives 46A2 generate and provide the fault action signal 88' to the gate terminals 48 of the bank 44 of the power inverter 30A, thereby causing the three-terminal power semiconductor devices 42 of the bank 44 of the power inverter 30A to short. The buffer 120 is coupled to provide the control signal 122 to the drives 46B2 for the bank 44 of the power inverter 30B.

The drives 46B2 generate and provide the fault action signal 92' to the gate terminals 48 of the bank 44 of the power inverter 30B, thereby causing the three-terminal power semiconductor devices 42 of the bank 44 of the power inverter 30B to short.

It will be appreciated that shorting the three-terminal power semiconductor devices 42 of the banks 44 of the inverters 30A and 30B is given by way of illustration only and not of limitation. In some embodiments, the three-terminal power semiconductor devices 42 of the banks 40 of the inverters 30A and 30B are shorted (and the three-terminal power semiconductor devices 42 of the banks 44 of the inverters 30A and 30B remain open).

Figure 5G:
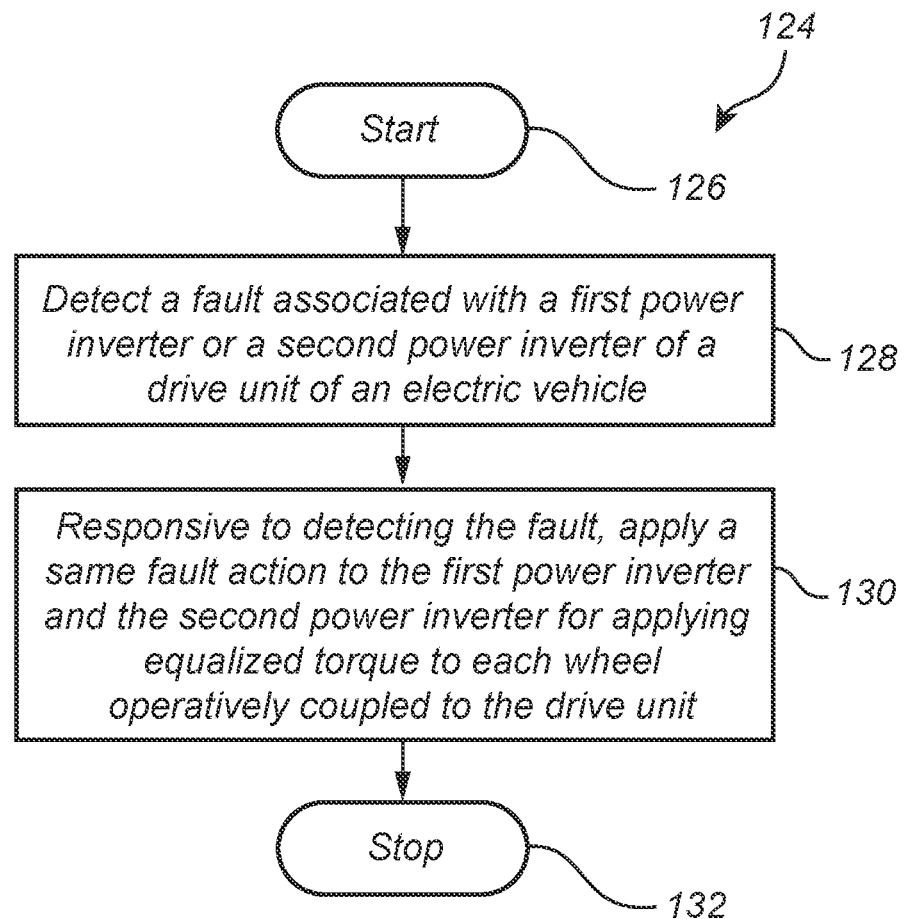
FIG. 5G is a flow chart of an illustrative method of placing both inverters of a drive unit in a safe state responsive to a detected fault associated with either inverter.

Referring additionally to FIG. 5G, in various embodiments an illustrative method 124 is provided for applying a same fault action to a first power inverter and a second power inverter for applying equalized torque to each wheel operatively coupled to a drive unit responsive to a fault associated with the first power inverter or the second power inverter.

The method 124 begins at a block 126. At a block 128 a fault associated with a first power inverter or a second power inverter of a drive unit of an electric vehicle is detected. At a block 130, responsive to detecting the fault, a same fault action is applied to the first power inverter and the second power inverter for applying equalized torque to each wheel operatively coupled to the drive unit. The method 124 ends at a block 130.

In various embodiments, a first processor for the first power inverter and a second processor for the second power inverter may monitor for the fault.

In various embodiments, the processor for the inverter with the fault associated therewith may communicate the fault action to the processor for the inverter without a fault associated therewith.

In various embodiments, the fault action may include causing all banks of three-terminal power semiconductor devices in the first power inverter and the second power inverter to open for motor speed less than a threshold speed or causing one bank of three-terminal power semiconductor devices in the first power inverter and the second power inverter to short for motor speed greater than the threshold speed.

In various embodiments, the fault associated with a first power inverter or a second power inverter of a drive unit of an electric vehicle may include a fault in a first processor for the first power inverter, or a second processor for the second power inverter, or health monitoring circuitry for the first processor and the second processor.

In various embodiments, applying a same fault action to the first power inverter and the second power inverter for applying equalized torque to each wheel operatively coupled to the drive unit may include applying, by circuitry external to the first processor and the second processor, a same fault action to the first power inverter and the second power inverter for applying equalized torque to each wheel operatively coupled to the drive unit.

In various embodiments, the fault action may include causing one bank of three-terminal power semiconductor devices in the first power inverter and the second power inverter to short.

Notwithstanding the above, it will be appreciated that in some instances speed of one motor may be different from speed of another motor. For example, during a turn, an outside wheel might be rotating faster than an inside wheel. Similarly, wheels may be rotating at different speeds in various wheel slip situations. In some such instances, because the processor 64A selects the appropriate speed-dependent fault action for its associated electrical motor 24A and the processor 64B selects the appropriate speed-dependent fault action for its associated electrical motor 24B, a speed-dependent fault action for one motor of a drive unit 20 (for example, based on back EMF and voltage of the battery 14) may be different from a speed-dependent fault action for the other motor of the drive unit 20.

In addition to the faults associated with the inverters 30A and 30B discussed above, loss of low voltage DC electrical power to the controller 32 (such as 12 VDC and referred to herein as 12V) results in a same fault action being applied to both inverters 30A and 30B in order to help avoid a torque imbalance between the two wheels 16 or 18 driven by a same drive unit 20.

It will be appreciated that, as shown in FIGS. 5A and 5C, the processors 64A and 64B, the drives 46A1, 46A2, 46B1, and 46B2, the health monitoring circuitry 102, and the three-phase short circuitry 108 all include components that are powered by low voltage DC electrical power (12V) supplied to the controller 32. It will be appreciated that loss of 12V supplied to the controller 32 means that the processors 64A and 64B, the drives 46A1, 46A2, 46B1, and 46B2, the health monitoring circuitry 102, and the three-phase short circuitry 108 are not available to apply a same fault action to both inverters 30A and 30B as discussed above.

Thus, in various embodiments and as discussed below, capability is provided to apply a same fault action to both inverters 30A and 30B in the event of loss of 12V supplied to the controller 32.

Figure 6A:
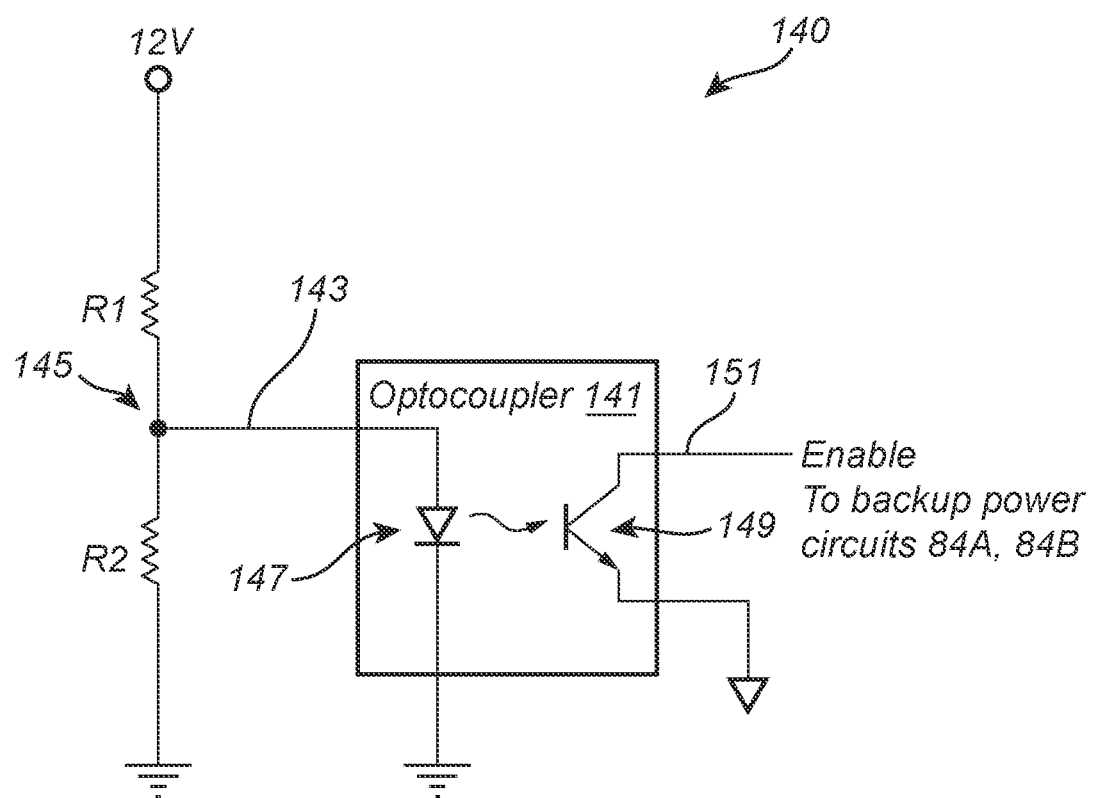
FIG. 6A is a schematic diagram of an illustrative circuit for detecting loss of low voltage DC electrical power.
Figure 6B:
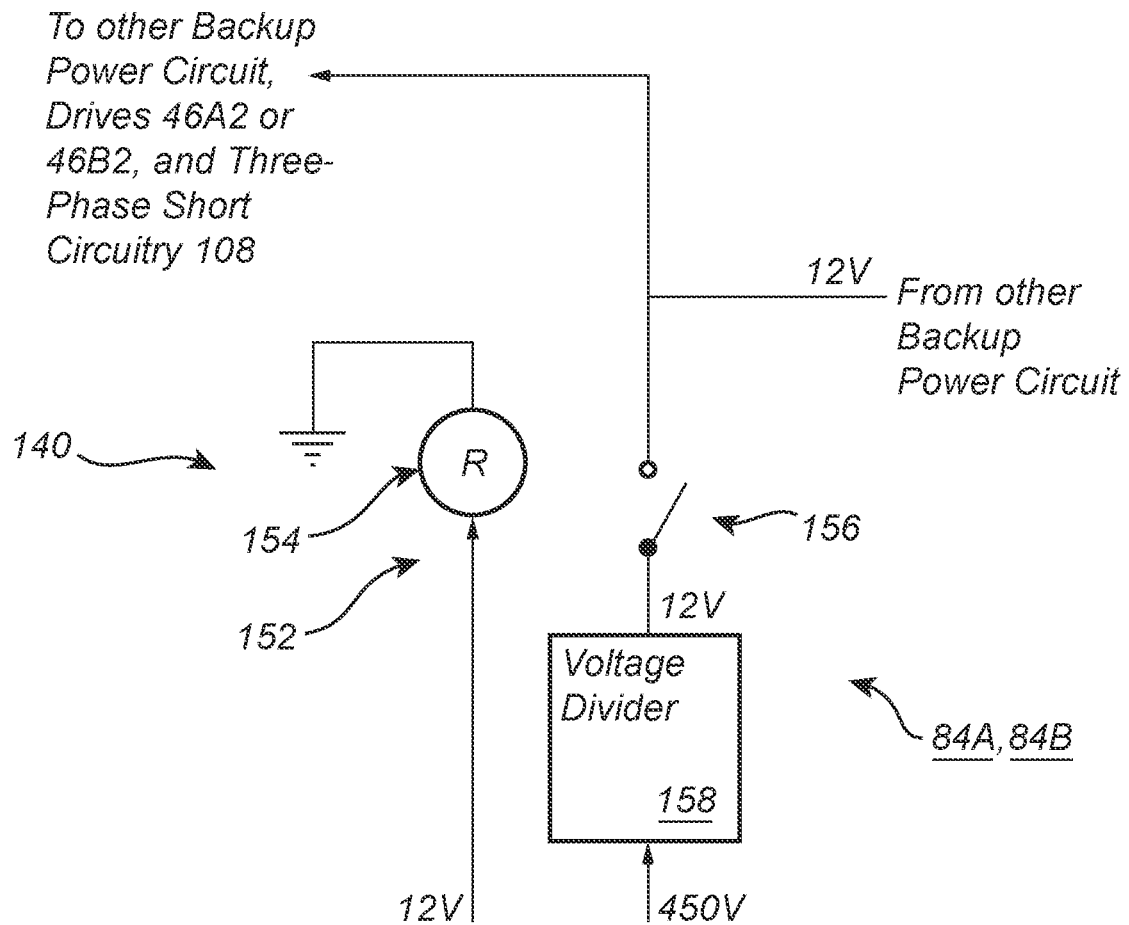
FIG. 6B is a block diagram in partial schematic form of details of an illustrative backup circuit for providing low voltage DC electrical power.

As shown in FIGS. 5A and 5C and referring additionally to FIGS. 6A-6B, in various embodiments and by way of overview a detection circuit 140 is configured to detect loss of low voltage DC electrical power (12V) supplied to the controller 32. A backup power circuit 84A is associated with the power inverter 30A and a backup power circuit 84B is associated with the power inverter 30B. Each backup power circuit 84A and 84B is configured to convert high voltage DC electrical power, such as 450 VDC, to low voltage DC electrical power (such as, for example, a step-down DC-DC converter) responsive to detection of loss of low voltage DC electrical power supplied to the controller 32. The three-phase short circuitry 108 is configured to apply a same fault action to the power inverter 30A and the power inverter 30B for applying equalized torque to each wheel 16 or 18 operatively coupled to the drive unit 20 responsive to detection of loss of low voltage DC electrical power supplied to the controller 32.

As shown in FIGS. 5A, 5C, and 6A, in various embodiments the detection circuit 140 uses an optocoupler 141 to detect loss of low voltage DC electrical power (12V) supplied to the controller 32. Low voltage DC electrical power (such as 12V) is supplied to a resistor $R_1$ which is electrically connected in series to a resistor $R_2$. The resistors $R_1$ and $R_2$ function as a voltage divider. A control signal 143 at a suitable voltage (such as, without limitation 5V) is supplied from a node 145 between the resistors $R_1$ and $R_2$ to a light-emitting diode (LED) 145 of the optocoupler 141. When energized, the LED 145 converts the electrical input into light and emits light (either visible light or infrared (IR) light). A phototransistor 147 detects the light emitted by the LED 145 and turns on. In various embodiments the phototransistor 149 is a pull-down transistor. The phototransistor 149 is coupled to provide an enable signal 151 to the backup power circuits 84A and 84B.

During normal operation, the control signal 143 is supplied to the LED 147 and the LED 147 emits light. The phototransistor 149 detects the light and turns on. Because the phototransistor 149 is a pull-down transistor, the enable signal 151 is low when the phototransistor 149 is on. When the enable signal 151 is low, the enable signal 151 pulls down the backup power circuits 84A and 84B (such as step-down DC-DC converters) such that the backup power circuits 84A and 84B are turned off and are prevented from applying a three-phase short.

In the event of loss of low voltage DC electrical power (12V), the signal 143 goes away and the LED 147 stops emitting light. As a result, the phototransistor 149 turns off and the enable signal 151 is high. When the enable signal 151 is high, the backup power circuits 84A and 84B are turned on and apply a three-phase short as described below. For example, the enable signal 151 may turn on a step-down DC-DC converter in each of the backup power circuits 84A and 84B to convert high voltage DC electrical power to low voltage DC electrical power (12V).

In various embodiments the gate drive circuit 46A and the gate drive circuit 46B include the backup power circuits 84A and 84B, respectively. High voltage DC electrical power (such as 450V) is provided to each of the backup power circuits 84A and 84B. Each backup power circuit 84A and 84B is configured to convert 450V DC electrical power to low voltage DC electrical power, such as 12 VDC electrical power. As such, the backup power circuits 84A and 84B suitably include a step-down DC-DC converter (as discussed above), voltage divider circuitry (as discussed below) if desired, or the like.

As shown in FIG. 6B, if desired, in some embodiments each backup power circuit 84A and 84B may optionally include a normally-open relay 152 having a relay coil 154 operably coupled to receive low voltage DC electrical power (12V) from the controller 32. In such embodiments the normally-open relay 152 also includes a normally-open contact 156. As discussed above, during normal operation low voltage DC electrical power 12V is provided to the relay coil 154 and the relay coil 154 is energized, thereby causing the normally-open contact 156 to open). In the event of loss of low voltage DC electrical power (12V), the relay coil 154 is de-energized, thereby causing the normally-open contact 156 to shut). Thus, in such embodiments, the detection circuit 140 suitably includes the relay coil 154 and the low voltage DC electrical power (12V) from the controller 32 may be considered to be a control signal.

In such embodiments, each backup power circuit 84A and 84B suitably includes a voltage divider 158 operably coupled to receive the high voltage DC electrical power. The voltage divider 158 is configured to convert the high voltage DC electrical power to the low voltage DC electrical power and is further configured to output the low voltage DC electrical power to the normally-open contact 156. In such embodiments, during normal operation (when low voltage DC electrical power is provided to the relay coil 154 and the normally-open contact 156 is open), the backup power circuits 84A and 84B do not provide 12V electrical power. Conversely, in the event of loss of low voltage DC electrical power (12V) (when the relay coil 154 is de-energized and the normally-open contact 156 is shut), the backup power circuits 84A and 84B provide 12V electrical power. Thus, in such embodiments, each backup power circuit 84A and 84B also suitably includes the normally-open contact 156.

As discussed above, in various embodiments the power inverter 30A and the power inverter 30B each include two banks 40 and 44 of the three-terminal power semiconductor devices 42. As discussed below, the three-phase short circuitry 108 is further configured to cause one bank 40 or 44 of the three-terminal power semiconductor devices 42 in the power inverter 30A and the power inverter 30B to short responsive to detection of loss of low voltage DC electrical power supplied to the controller 32.

As shown in FIGS. 5A and 5C, regardless of how loss of low voltage DC electrical power (12V) is detected and how the low voltage DC electrical power (12V) is generated by the backup power circuits 84A and 84B, the low voltage DC electrical power (12V) is supplied from the backup power circuits 84A and 84B to the voltage regulator 116. In response to application of the low voltage DC electrical power (12V), the voltage regulator 116 outputs a 5 VDC control signal 122. The control signal 122 is input to the buffers 118 and 120. The buffer 118 is coupled to provide the control signal 122 to the drives 46A2 for the bank 44 of the power inverter 30A. The drives 46A2 generate and provide the fault action signal 88' to the gate terminals 48 of the bank 44 of the power inverter 30A, thereby causing the three-terminal power semiconductor devices 42 of the bank 44 of the power inverter 30A to short. The buffer 120 is coupled to provide the control signal 122 to the drives 46B2 for the bank 44 of the power inverter 30B. The drives 46B2 generate and provide the fault action signal 92' to the gate terminals 48 of the bank 44 of the power inverter 30B, thereby causing the three-terminal power semiconductor devices 42 of the bank 44 of the power inverter 30B to short.

It will be appreciated that shorting the three-terminal power semiconductor devices 42 of the banks 44 of the inverters 30A and 30B is given by way of illustration only and not of limitation. In some embodiments, the three-terminal power semiconductor devices 42 of the banks 40 of the inverters 30A and 30B are shorted (and the three-terminal power semiconductor devices 42 of the banks 44 of the inverters 30A and 30B remain open).

Figure 6C:
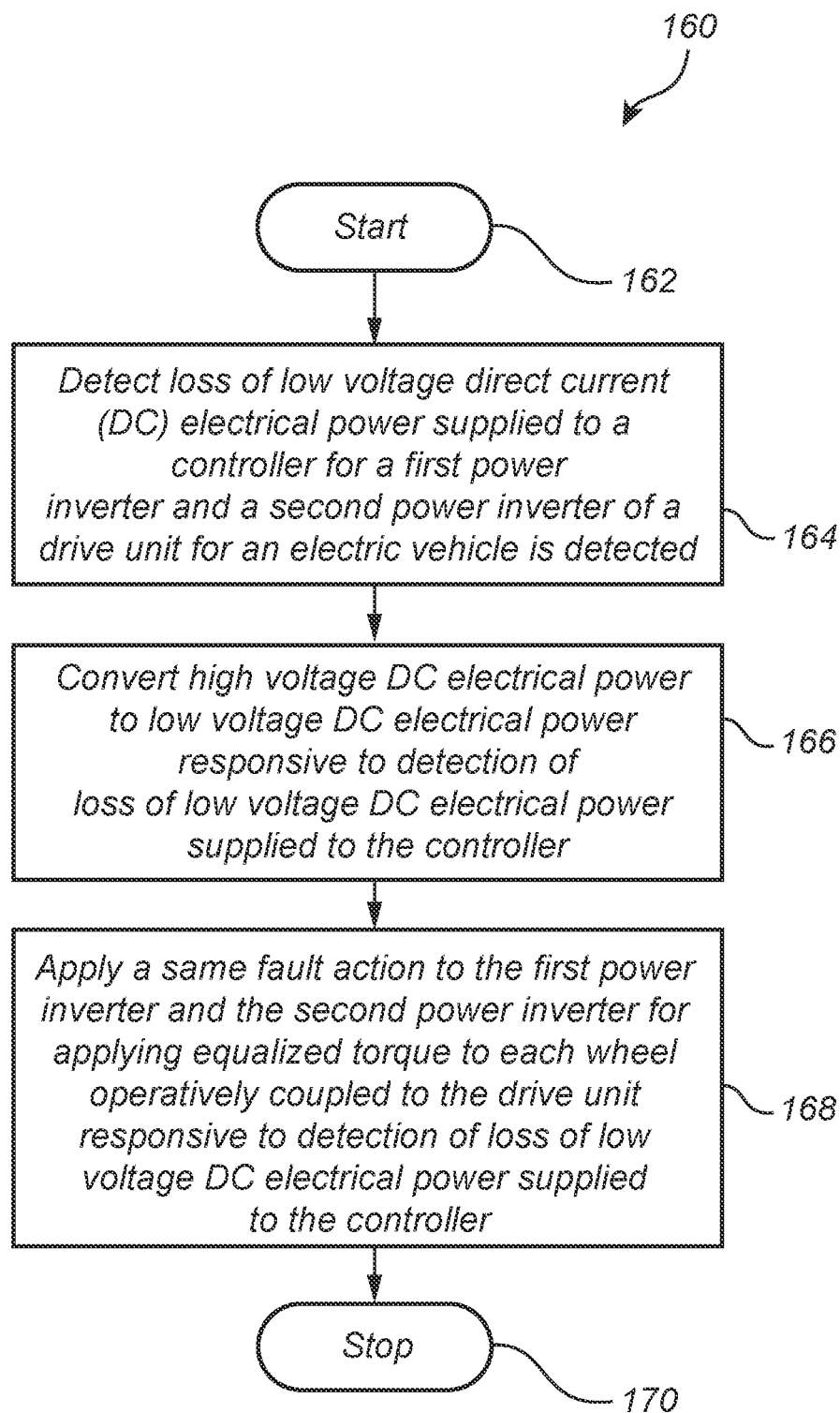
FIG. 6C is a flowchart of a method of placing both inverters of a drive unit in a safe state responsive to loss of low voltage DC electrical power.

In various embodiments and as shown in FIG. 6C, a method 160 is provided for applying a same fault action to both inverters of a drive unit of an electric vehicle in the event of loss of 12V supplied to a common controller for both inverters.

The method 160 starts at a block 162. At a block 164, loss of low voltage direct current (DC) electrical power supplied to a controller for a first processor for a first power inverter and a second processor for a second power inverter of a drive unit for an electric vehicle is detected. At a block 166 high voltage DC electrical power is converted to low voltage DC electrical power responsive to detection of loss of low voltage DC electrical power supplied to the controller. At a block 168 a same fault action is applied to the first power inverter and the second power inverter for applying equalized torque to each wheel operatively coupled to the drive unit responsive to detection of loss of low voltage DC electrical power supplied to the controller. The method 160 stops at a block 170.

In various embodiments a control signal may be provided responsive to presence of low voltage DC electrical power supplied to the controller.

In various embodiments applying a same fault action to the first power inverter and the second power inverter for applying equalized torque to each wheel operatively coupled to the drive unit responsive to detection of loss of low voltage DC electrical power supplied to the controller may include applying a same fault action to the first power inverter and the second power inverter for applying equalized torque to each wheel operatively coupled to the drive unit responsive to absence of the control signal.

In various embodiments the fault action may include causing one bank of three-terminal power semiconductor devices in the first power inverter and the second power inverter to short.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A controller comprising:
    a first processor for a first power inverter;
    a non-transitory computer-readable media configured to store computer-executable instructions configured to cause the first processor to:
        generate a first clock signal and a second clock signal;
        identify a pulse width modulation method of the first power inverter and a pulse width modulation method of a second power inverter;
        identify and compare a switching frequency of the first power inverter and a switching frequency of the second power inverter;
        determine an optimized phase shift between the first power inverter and the second power inverter responsive to the pulse width modulation method of the first power inverter and the pulse width modulation method of the second power inverter and the switching frequency of the first power inverter and the switching frequency of the second power inverter;
        synchronize the optimized phase shift between the first power inverter and the second power inverter;
        shift the second clock signal from the first clock signal by the determined optimized phase shift;
        identify a dominant harmonic frequency among harmonic frequencies of the pulse width modulation method of the first power inverter and the pulse width modulation method of the second power inverter; and
        determine the optimized phase shift between the first power inverter and the second power inverter responsive to the dominant harmonic frequency among the harmonic frequencies of the pulse width modulation method of the first power inverter and the pulse width modulation method of the second power inverter; and
    a second processor for the second power inverter and configured to receive the second clock signal.

2. The controller of claim 1, wherein the pulse width modulation method of the first power inverter and the pulse width modulation method of the second power inverter are the same pulse width modulation method.

3. The controller of claim 1, wherein the pulse width modulation method of the first power inverter and the pulse width modulation method of the second power inverter are different pulse width modulation methods.

4. The controller of claim 1, wherein:
    the dominant harmonic frequency includes a first harmonic frequency; and
    the optimized phase shift is 180 degrees.

5. The controller of claim 1, wherein:
    the dominant harmonic frequency includes a second harmonic frequency; and
    the optimized phase shift is 90 degrees.

6. A dual power inverter module comprising:
    a DC link capacitor electrically connectable to a source of high voltage direct current (DC) electrical power;
    a first power inverter electrically connectable to the DC link capacitor and configured to convert high voltage DC electrical power to three phase high voltage alternating current (AC) electrical power, the first power inverter being further configured to supply the three phase high voltage AC electrical power to a first electric motor;
    a second power inverter electrically connectable to the DC link capacitor and configured to convert high voltage DC electrical power to three phase high voltage AC electrical power, the second power inverter being further configured to supply the three phase high voltage AC electrical power to a second electric motor; and
    a controller including:
        a first processor for the first power inverter;
        a non-transitory computer-readable media configured to store computer-executable instructions configured to cause the first processor to:
            generate a first clock signal and a second clock signal;
            identify a pulse width modulation method of the first power inverter and a pulse width modulation method of the second power inverter;
            identify and compare a switching frequency of the first power inverter and a switching frequency of the second power inverter;
            determine an optimized phase shift between the first power inverter and the second power inverter responsive to the pulse width modulation method of the first power inverter and the pulse width modulation method of the second power inverter and the switching frequency of the first power inverter and the switching frequency of the second power inverter;
            synchronize the optimized phase shift between the first power inverter and the second power inverter;
            shift the second clock signal from the first clock signal by the determined optimized phase shift;
            identify a dominant harmonic frequency among harmonic frequencies of the pulse width modulation method of the first power inverter and the pulse width modulation method of the second power inverter; and
            determine an optimized phase shift between the first power inverter and the second power inverter responsive to the dominant harmonic frequency among the harmonic frequencies of the pulse width modulation method of the first power inverter and the pulse width modulation method of the second power inverter; and
        a second processor for the second power inverter and configured to receive the second clock signal.

7. The dual power inverter module of claim 6, wherein the pulse width modulation method of the first power inverter and the pulse width modulation method of the second power inverter are the same pulse width modulation method.

8. The dual power inverter module of claim 6, wherein the pulse width modulation method of the first power inverter and the pulse width modulation method of the second power inverter are different pulse width modulation methods.

9. The dual power inverter module of claim 6, wherein:
the dominant harmonic frequency includes a first harmonic frequency; and
the optimized phase shift is 180 degrees.

10. The dual power inverter module of claim 6, wherein:
the dominant harmonic frequency includes a second harmonic frequency; and
the optimized phase shift is 90 degrees.

11. An electric vehicle comprising:
a vehicle body;
a high voltage direct current (DC) electrical battery disposed within the vehicle body;
left and right front wheels configured to rotate;
left and right rear wheels configured to rotate;
left and right electric motors mechanically couplable to rotate at least one set of wheels chosen from the left and right front wheels and the left and right rear wheels; and
at least one dual power inverter module including:
  a DC link capacitor electrically connectable to the high voltage DC electrical battery;
  a first power inverter electrically connectable to the DC link capacitor and configured to convert high voltage DC electrical power to three phase high voltage alternating current (AC) electrical power, the first power inverter being further configured to supply the three phase high voltage AC electrical power to an electric motor chosen from the left and right electric motors;
  a second power inverter electrically connectable to the DC link capacitor and configured to convert high voltage DC electrical power to three phase high voltage AC electrical power, the second power inverter being further configured to supply the three phase high voltage AC electrical power to the other electric motor chosen from the left and right electric motors; and
  a common controller electrically connectable to the first power inverter and the second power inverter, the common controller being configured to control the first power inverter and the second power inverter, the common controller including:
    a first processor for the first power inverter;
    a non-transitory computer-readable media configured to store computer-executable instructions configured to cause the first processor to:
      generate a first clock signal and a second clock signal;
      identify a pulse width modulation method of the first power inverter and a pulse width modulation method of the second power inverter;
      identify and compare a switching frequency of the first power inverter and a switching frequency of the second power inverter;
      determine an optimized phase shift between the first power inverter and the second power inverter responsive to the pulse width modulation method of the first power inverter and the pulse width modulation method of the second power inverter and the switching frequency of the first power inverter and the switching frequency of the second power inverter;
      synchronize the optimized phase shift between the first power inverter and the second power inverter;
      shift the second clock signal from the first clock signal by the determined optimized phase shift;
      identify a dominant harmonic frequency among harmonic frequencies of the pulse width modulation method of the first power inverter and the pulse width modulation method of the second power inverter; and
      determine an optimized phase shift between the first power inverter and the second power inverter responsive to the dominant harmonic frequency among the harmonic frequencies of the pulse width modulation method of the first power inverter and the pulse width modulation method of the second power inverter; and
    a second processor for the second power inverter and configured to receive the second clock signal.

12. The electric vehicle of claim 11, wherein the pulse width modulation method of the first power inverter and the pulse width modulation method of the second power inverter are the same pulse width modulation method.

13. The electric vehicle of claim 11, wherein the pulse width modulation method of the first power inverter and the pulse width modulation method of the second power inverter are different pulse width modulation methods.

14. The electric vehicle of claim 11, wherein:
the dominant harmonic frequency includes a first harmonic frequency; and
the optimized phase shift is 180 degrees.

15. The electric vehicle of claim 11, wherein:
the dominant harmonic frequency includes a second harmonic frequency; and
the optimized phase shift is 90 degrees.

* * * * *